US011992918B2

(12) United States Patent
Eckel et al.

(10) Patent No.: US 11,992,918 B2
(45) Date of Patent: May 28, 2024

(54) ABRASIVE ARTICLE MAKER WITH DIFFERENTIAL TOOLING SPEED

(71) Applicant: 3M INNOVATIVE PROPERTIES COMPANY, St. Paul, MN (US)

(72) Inventors: Joseph B. Eckel, Vadnais Heights, MN (US); Thomas J. Nelson, Woodbury, MN (US); Aaron K. Nienaber, Lake Elmo, MN (US); Ann M. Hawkins, Lake Elmo, MN (US); Amelia W. Koenig, Minneapolis, MN (US); Negus B. Adefris, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 592 days.

(21) Appl. No.: 17/415,011

(22) PCT Filed: Dec. 10, 2019

(86) PCT No.: PCT/IB2019/060613
§ 371 (c)(1),
(2) Date: Jun. 17, 2021

(87) PCT Pub. No.: WO2020/128716
PCT Pub. Date: Jun. 25, 2020

(65) Prior Publication Data
US 2022/0040816 A1 Feb. 10, 2022

Related U.S. Application Data

(60) Provisional application No. 62/780,994, filed on Dec. 18, 2018.

(51) Int. Cl.
*B24D 11/00* (2006.01)
*B24D 3/00* (2006.01)
(Continued)

(52) U.S. Cl.
CPC .............. *B24D 11/005* (2013.01); *B24D 3/28* (2013.01); *B24D 18/0072* (2013.01); *C09K 3/14* (2013.01)

(58) Field of Classification Search
CPC .... B24D 11/005; B24D 3/28; B24D 18/0072; C09K 3/14
(Continued)

(56) References Cited

U.S. PATENT DOCUMENTS 1,910,444 A   5/1933 Nicholson
2,141,658 A * 12/1938 Melton ................ B24D 11/005
                                              118/308
(Continued)

FOREIGN PATENT DOCUMENTS

EP   1207015   5/2002
EP   3086903   7/2015
(Continued)

OTHER PUBLICATIONS

International Search Report for PCT International Application No. PCT/IB2019/060613, mailed on Feb. 21, 2020, 4 pages.
(Continued)

*Primary Examiner* — James E McDonough
(74) *Attorney, Agent, or Firm* — Aleksander Medved

(57) ABSTRACT

Apparatus includes a production tooling having a dispensing surface with a plurality of cavities and formed into an endless belt. An abrasive particle feeder dispenses shaped abrasive particles onto the dispensing surface and into the plurality of cavities. A resin coated backing receives shaped abrasive particles from the cavities of the production tooling at a deposit point. A detecting device detects a pattern transition zone as the production tooling moves in the direction of travel and provides pattern transition zone detection data to one or more controllers to control a speed
(Continued)

of the production tooling and/or a speed of the resin coated backing as the detected pattern transition zone passes the deposit point to change a pattern density of the shaped abrasive particles in a portion of the resin coated backing corresponding to the pattern transition zone of the production tooling.

21 Claims, 6 Drawing Sheets

(51) Int. Cl.
  *B24D 3/28* (2006.01)
  *B24D 18/00* (2006.01)
  *C09K 3/14* (2006.01)
(58) Field of Classification Search
  USPC .................................................. 51/293, 297
  See application file for complete search history.

(56) References Cited

U.S. PATENT DOCUMENTS

| | | | |
|---|---|---|---|
| 3,041,156 A | 6/1962 | Rowse | |
| 3,058,819 A | 10/1962 | Paulson | |
| 3,616,580 A | 11/1971 | Dewell | |
| 3,676,092 A | 7/1972 | Buell | |
| 3,729,873 A | 5/1973 | Sandell | |
| 3,784,365 A | 1/1974 | Caserta | |
| 3,833,346 A | 9/1974 | Wirth | |
| 3,868,232 A | 2/1975 | Sioui | |
| 3,869,834 A | 3/1975 | Mullin | |
| 4,215,516 A * | 8/1980 | Huschle | F16G 3/10 156/304.3 |
| 4,314,827 A | 2/1982 | Leitheiser | |
| 4,475,926 A | 10/1984 | Hickory | |
| 4,623,364 A | 11/1986 | Cottringer | |
| 4,652,275 A | 3/1987 | Bloecher | |
| 4,734,104 A | 3/1988 | Broberg | |
| 4,737,163 A | 4/1988 | Larkey | |
| 4,744,802 A | 5/1988 | Schwabel | |
| 4,751,138 A | 6/1988 | Tumey | |
| 4,770,671 A | 9/1988 | Monroe | |
| 4,799,939 A | 1/1989 | Bloecher | |
| 4,881,951 A | 11/1989 | Wood | |
| 4,997,461 A | 3/1991 | Markhoff-Matheny | |
| 5,009,675 A | 4/1991 | Kunz | |
| 5,011,508 A | 4/1991 | Wald | |
| 5,042,991 A | 8/1991 | Kunz | |
| 5,078,753 A | 1/1992 | Broberg | |
| 5,085,671 A | 2/1992 | Martin | |
| 5,152,917 A | 10/1992 | Pieper | |
| 5,201,916 A | 4/1993 | Berg | |
| 5,203,884 A | 4/1993 | Buchanan | |
| 5,213,591 A | 5/1993 | Celikkaya | |
| 5,269,821 A | 12/1993 | Helmin | |
| 5,352,254 A | 10/1994 | Celikkaya | |
| 5,366,523 A | 11/1994 | Rowenhorst | |
| 5,378,251 A | 1/1995 | Culler | |
| 5,417,726 A | 5/1995 | Stout | |
| 5,435,816 A | 7/1995 | Spurgeon | |
| 5,436,063 A | 7/1995 | Follett | |
| 5,453,106 A | 9/1995 | Roberts | |
| 5,496,386 A | 3/1996 | Broberg | |
| 5,498,268 A | 3/1996 | Gagliardi | |
| 5,520,711 A | 5/1996 | Helmin | |
| 5,609,706 A | 3/1997 | Benedict | |
| RE35,570 E | 7/1997 | Rowenhorst | |
| 5,672,097 A | 9/1997 | Hoopman | |
| 5,766,277 A | 6/1998 | DeVoe | |
| 5,946,991 A | 9/1999 | Hoopman | |
| 5,954,844 A | 9/1999 | Law | |
| 5,961,674 A | 10/1999 | Gagliardi | |
| 5,975,987 A | 11/1999 | Hoopman | |
| 5,975,988 A | 11/1999 | Christianson | |
| 5,984,988 A | 11/1999 | Berg | |
| 6,077,601 A | 6/2000 | DeVoe | |
| 6,129,540 A | 10/2000 | Hoopman | |
| 6,228,133 B1 | 5/2001 | Thurber | |
| 7,553,346 B2 | 6/2009 | Welygan | |
| 8,034,137 B2 | 10/2011 | Erickson | |
| 8,080,072 B2 | 12/2011 | Woo | |
| 8,142,531 B2 | 3/2012 | Adefris | |
| 8,142,532 B2 | 3/2012 | Erickson | |
| 8,142,891 B2 | 3/2012 | Culler | |
| 9,017,150 B2 | 4/2015 | Keipert | |
| 9,440,332 B2 | 9/2016 | Gaeta | |
| 9,457,453 B2 | 10/2016 | Seth | |
| 9,604,346 B2 | 3/2017 | Breder | |
| 9,776,302 B2 | 10/2017 | Keipert | |
| 9,969,057 B2 | 5/2018 | Eugster | |
| 2001/0003884 A1 | 6/2001 | Wei | |
| 2009/0165394 A1 | 7/2009 | Culler | |
| 2009/0169816 A1 | 7/2009 | Erickson | |
| 2012/0227333 A1 | 9/2012 | Adefris | |
| 2013/0040537 A1 | 2/2013 | Schwabel | |
| 2013/0125477 A1 | 5/2013 | Adefris | |
| 2013/0344786 A1 | 12/2013 | Keipert | |
| 2014/0106126 A1 | 4/2014 | Gaeta | |
| 2014/0290147 A1 | 10/2014 | Seth | |
| 2015/0224629 A1 | 8/2015 | Moren | |
| 2015/0291866 A1 | 10/2015 | Arcona | |
| 2016/0311081 A1 * | 10/2016 | Culler | B24D 11/001 |
| 2016/0311084 A1 | 10/2016 | Culler | |
| 2016/0315081 A1 | 10/2016 | Park | |
| 2017/0050293 A1 | 2/2017 | Gaeta | |
| 2017/0225299 A1 | 8/2017 | Keipert | |
| 2017/0368667 A1 | 12/2017 | Keipert | |
| 2018/0029194 A1 | 2/2018 | Keipert | |
| 2018/0086957 A1 | 3/2018 | Sahlin | |

FOREIGN PATENT DOCUMENTS

| | | |
|---|---|---|
| EP | 3319758 | 1/2017 |
| WO | WO 2003-008151 | 1/2003 |
| WO | WO 2007-005452 | 1/2007 |
| WO | WO 2011-068714 | 6/2011 |
| WO | WO 2012-112305 | 8/2012 |
| WO | WO 2012-112322 | 8/2012 |
| WO | WO 2014-131937 | 9/2014 |
| WO | WO 2014-176108 | 10/2014 |
| WO | WO 2014-206967 | 12/2014 |
| WO | WO 2015-100018 | 7/2015 |
| WO | WO 2015-100020 | 7/2015 |
| WO | WO 2015-100220 | 7/2015 |
| WO | WO 2016-028683 | 2/2016 |
| WO | WO 2016-044158 | 3/2016 |
| WO | WO 2016-064726 | 4/2016 |
| WO | WO 2016-089675 | 6/2016 |
| WO | WO 2016-205133 | 12/2016 |
| WO | WO 2016-205267 | 12/2016 |
| WO | WO 2017-007703 | 1/2017 |
| WO | WO 2017-007714 | 1/2017 |
| WO | WO 2017-083249 | 5/2017 |
| WO | WO 2017-083255 | 5/2017 |
| WO | WO 2018-080765 | 5/2018 |
| WO | WO 2018-118596 | 6/2018 |
| WO | WO 2018-118690 | 6/2018 |
| WO | WO 2018-118695 | 6/2018 |
| WO | WO 2018-134732 | 7/2018 |
| WO | WO 2018-207145 | 11/2018 |
| WO | WO 2019-215571 | 11/2019 |
| WO | WO 2020-128717 | 6/2020 |
| WO | WO 2020-128719 | 6/2020 |
| WO | WO 2020-128720 | 6/2020 |
| WO | WO 2020-128752 | 6/2020 |
| WO | WO 2020-128833 | 6/2020 |
| WO | WO 2020-128838 | 6/2020 |
| WO | WO 2020-128842 | 6/2020 |
| WO | WO 2020-128844 | 6/2020 |
| WO | WO 2020-128845 | 6/2020 |
| WO | WO 2020-128852 | 6/2020 |
| WO | WO 2020-128853 | 6/2020 |

(56) References Cited

FOREIGN PATENT DOCUMENTS

| | | |
|---|---|---|
| WO | WO 2020-128854 | 6/2020 |
| WO | WO 2020-128857 | 6/2020 |
| WO | WO 2020-128858 | 6/2020 |

OTHER PUBLICATIONS

International Search Report for PCT International Application No. PCT/IB2019/060615, mailed on Feb. 26, 2020, 5 pages.
International Search Report for PCT International Application No. PCT/IB2019/060624, mailed on Mar. 11, 2020, 4 pages.
International Search Report for PCT International Application No. PCT/IB2019/060627, mailed on Jul. 2, 2020, 8 pages.
International Search Report for PCT International Application No. PCT/IB2019/060779, mailed on Mar. 10, 2020, 5 pages.
International Search Report for PCT International Application No. PCT/IB2019/060924, mailed on Apr. 29, 2020, 4 pages.
International Search Report for PCT International Application No. PCT/IB2019/060929, mailed on Mar. 23, 2020, 4 pages.
International Search Report for PCT International Application No. PCT/IB2019/060934, mailed on Mar. 18, 2020, 5 pages.
International Search Report for PCT International Application No. PCT/IB2019/060936, mailed on Mar. 30, 2020, 5 pages.
International Search Report for PCT International Application No. PCT/IB2019/060938, mailed on Apr. 28, 2020, 4 pages.
International Search Report for PCT International Application No. PCT/IB2019/060947, mailed on Mar. 30, 2020, 5 pages.
International Search Report for PCT International Application No. PCT/IB2019/060949, mailed on Jun. 5, 2020, 4 pages.
International Search Report for PCT International Application No. PCT/IB2019/060950, mailed on Mar. 30, 2020, 5 pages.
International Search Report for PCT International Application No. PCT/IB2019/060953, mailed on Apr. 2, 2020, 4 pages.
International Search Report for PCT International Application No. PCT/IB2019/060954, mailed on Apr. 24, 2020, 5 pages.

* cited by examiner

ABRASIVE ARTICLE MAKER WITH DIFFERENTIAL TOOLING SPEED

CROSS REFERENCE TO RELATED APPLICATIONS

This application is a national stage filing under 35 U.S.C. 371 of PCT/IB2019/060613, filed Dec. 10, 2019, which claims the benefit of U.S. Provisional Application No. 62/780,994, filed Dec. 18, 2018, the disclosures of which are incorporated by reference in their entireties herein.

TECHNICAL FIELD

The present disclosure broadly relates to methods of making coated abrasive articles and, more particularly, to methods of using differential tooling speeds during manufacture to change densities of abrasive particles on the resin layer backing to make different patterns and to hide potential defects.

BACKGROUND

U.S. Patent Application Pub. No. 2016/0311081, to 3M Company, St. Paul MN, discloses a coated abrasive article maker apparatus including a first web path that guides a production tooling such that it wraps a portion of the outer circumference of an abrasive particle transfer roll and a second web path for a resin coated backing that guides the resin coated backing such that it wraps a portion of the outer circumference of the abrasive particle transfer roll with the resin layer positioned facing the dispensing surface of the production tooling that is positioned between the resin coated backing and the outer circumference of the abrasive particle transfer roll. The abrasive particles are transferred from cavities in the production tooling to the resin coated backing as the resin coated backing and the production tooling traverse around the abrasive particle transfer roll. The production tooling includes cavities that are complementary in shape and size to the abrasive particles being coated. The cavities of the production tooling position and orient the abrasive particles (especially shaped abrasive particles) for transfer to resin layer coated backing sheets to create the coated abrasive particles.

The first web path forms the production tooling into an endless belt for continuous transfer by, for example, thermally splicing the ends of the production tooling. The production tooling then passes an abrasive particle feeder that dispenses abrasive particles onto the dispensing surface and into the cavities. The abrasive particles are transferred from the cavities to the resin coated backing as the resin coated backing and the production tooling come together in a particle transfer zone on the outer circumference of the abrasive particle transfer roll.

The resulting coated abrasive article generally includes abrasive articles with the desired density and particle orientation throughout the coated abrasive article. However, it has been found that areas where the cavities of the production tooling are inconsistent, such as at the location of the thermal splicing of the ends of the production tooling or at sewn seams, leads to inconsistencies and sometimes defects in the resulting coated abrasive article. Since the thermal splicing zone of the production tooling repeats as the production tooling rotates as an endless belt, the defects caused by the thermal splicing zone may occur at regular intervals on the resulting coated abrasive article. It is desired to remove such defects during the production process.

Also, it is desired to have the capability to change the density of the particle transfer to the resin layer coated backing sheets. However, changing the production tooling is a time-consuming and expensive process that requires the production line to be closed to replace the production tooling. Techniques are desired to change the densities of the particles transferred to the resin layer coated backing sheets to create different patterns without having to modify the production tooling or to close the production line.

SUMMARY OF THE DISCLOSURE

The present disclosure addresses the above-mentioned and other needs in the art by providing a method of making coated abrasive articles that includes providing a production tooling in the form of an endless belt having a dispensing surface with a plurality of cavities, wherein at least a portion of the plurality of cavities is missing in a pattern transition zone, and guiding the production tooling in a direction of travel past an abrasive particle feeder. Shaped abrasive particles are dispensed onto the dispensing surface and into the plurality of cavities of the production tooling, and a resin coated backing is guided adjacent the production tooling in the direction of travel such that shaped abrasive particles from the plurality of cavities of the production tooling are provided onto the resin coated backing at a deposit point. A pattern transition zone is detected as the production tooling moves in the direction of travel and the resulting pattern transition zone detection data is used to control the speed of the production tooling and/or the speed of the resin coated backing in the direction of travel whereby a speed of the production tooling and/or the resin coated backing is adjusted as the detected pattern transition zone passes the deposit point so as to change a pattern density of the shaped abrasive particles in a portion of the resin coated backing corresponding to the pattern transition zone of the production tooling.

In sample embodiments, the pattern transition zone comprises a splice zone where the first end of the production tooling is spliced to the second end of the production tooling to form the endless belt. Controlling the speed of the production tooling and/or the speed of the resin coated backing in the direction of travel in response to the pattern transition zone detection data comprises receiving splice zone detection data and controlling the speed of the production tooling and/or the speed of the resin coated backing in accordance with the splice zone detection data whereby the production tooling is sped up and/or the resin coated backing is slowed down for a duration of a detected splice zone as the detected splice zone passes the deposit point. In the sample embodiments, a vacuum pull roll is disposed adjacent the resin coated backing and the vacuum pull roll applies a vacuum to the production tooling to hold the shaped abrasive particles in the plurality of cavities during rotation of the vacuum pull roll and the vacuum pull roll releases the vacuum to enable the shaped abrasive particles to fall onto the resin coating backing under the force of gravity at the deposit point.

In the sample embodiments, detecting the pattern transition zone comprises a vision system visually recognizing the pattern transition zone on the production tooling. In other sample embodiments, detecting the pattern transition zone comprises a magnet recognizing metal embedded into the production tooling to mark the pattern transition zone. Detecting the pattern transition zone may further comprise an encoder or other means of keeping track of lineal or rotational position of the moving production tooling and/or resin coated backing that can be used to track the positions of the production tooling and/or resin coated backing with respect to time. For example, a timing belt may be used to measure a position of the pattern transition zone as the endless belt rotates in the direction of travel.

In the sample embodiments, the pattern transition zone detection data comprises times t1 and t2 marking the beginning and end of the pattern transition zone, respectively, and controlling the speed of the production tooling and/or the speed of the resin coated backing in the direction of travel comprises controlling for a time t2−t1 relative speeds of the production tooling and the resin coated backing at the deposit point.

The methods in the sample embodiments are implemented by a coated abrasive article maker apparatus comprising a production tooling in the form of an endless belt having a dispensing surface with a plurality of cavities, wherein at least a portion of the plurality of cavities is missing in a pattern transition zone of the production tooling; at least one roller guides the production tooling through the coated abrasive article maker apparatus, the at least one roller including at least one drive roller for pulling the endless belt in a direction of travel; an abrasive particle feeder positioned adjacent the production tooling so as to dispense shaped abrasive particles onto the dispensing surface and into the plurality of cavities of the production tooling; a resin coated backing guide that guides a resin coated backing through the coated abrasive article maker apparatus in the direction of travel, the resin coated backing positioned to receive shaped abrasive particles from the plurality of cavities of the production tooling at a deposit point; means for detecting the pattern transition zone as the production tooling moves in the direction of travel and for providing pattern transition zone detection data; and at least one controller that receives the pattern transition zone detection data and controls at least one of a speed of rotation of the drive roller and a speed of the resin coated backing guide in accordance with the pattern transition zone detection data. During operation, a speed of the production tooling and/or the resin coated backing is adjusted as the detected pattern transition zone passes the deposit point to change a pattern density of the shaped abrasive particles in a portion of the resin coated backing corresponding to the pattern transition zone of the production tooling.

In sample embodiments, the pattern transition zone comprises a splice zone where the first end of the production tooling is spliced to the second end of the production tooling to form the endless belt. The at least one controller receives splice zone detection data and controls a speed of rotation of the drive roller and/or a speed of the resin coated backing guide in accordance with the splice zone detection data. In operation, the production tooling is sped up and/or the resin coated backing is slowed down for a duration of a detected splice zone as the detected splice zone passes the deposit point.

In the sample embodiments, the drive roller comprises a vacuum pull roll that applies a vacuum to the production tooling to hold the shaped abrasive particles in the plurality of cavities during rotation of the vacuum pull roll. The vacuum pull roll is disposed adjacent the resin coated backing whereby the deposit point comprises a position on the vacuum pull roll where the vacuum is released to enable the shaped abrasive particles to fall onto the resin coating backing under the force of gravity.

In the sample embodiments, the detecting means may comprise a vision system that visually recognizes the pattern transition zone on the production tooling. The detecting means also may comprise a magnet that recognizes metal embedded into the production tooling to mark the pattern transition zone. The detecting means also may comprise an encoder or other means of keeping track of lineal or rotational position of the moving production tooling and/or resin coated backing that can be used to track the positions of the production tooling and/or resin coated backing with respect to time. For example, a timing belt may be used to measure a position of the pattern transition zone as the endless belt rotates in the direction of travel.

In the sample embodiments, the pattern transition zone detection data comprises times t1 and t2 marking the beginning and end of the pattern transition zone, respectively, and the least one controller controls for a time t2−t1 relative speeds of rotation of the drive roller and the resin coated backing guide at the deposit point.

BRIEF DESCRIPTION OF THE FIGURES

The drawings illustrate generally, by way of example, but not by way of limitation, various embodiments discussed in the present document.

DETAILED DESCRIPTION

Figure 1:
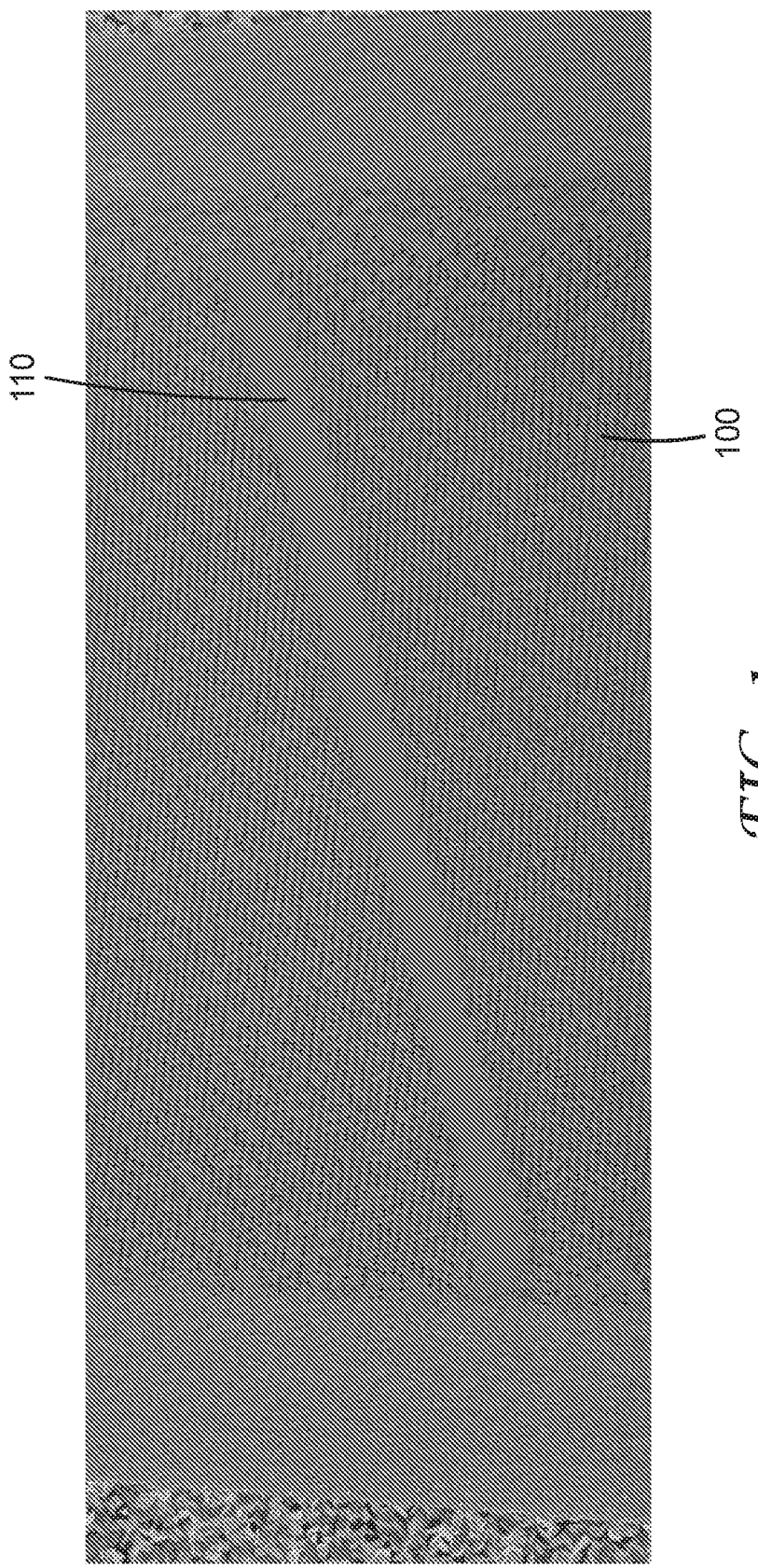
FIG. 1 illustrates a coated abrasive article having defects at the positions of a thermal splice of the production tooling.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

As used herein "shaped abrasive particle" means an abrasive particle having a predetermined or non-random shape. One process to make a shaped abrasive particle such as a shaped ceramic abrasive particle includes shaping the precursor ceramic abrasive particle in a mold having a predetermined shape to make ceramic shaped abrasive particles. Ceramic shaped abrasive particles, formed in a mold, are one species in the genus of shaped ceramic abrasive particles. Other processes to make other species of shaped ceramic abrasive particles include extruding the precursor ceramic abrasive particle through an orifice having a pre-determined shape, printing the precursor ceramic abrasive particle though an opening in a printing screen having a predetermined shape, or embossing the precursor ceramic abrasive particle into a predetermined shape or pattern. In other examples, the shaped ceramic abrasive particles can be cut from a sheet into individual particles. Examples of suitable cutting methods include mechanical cutting, laser cutting, or water jet cutting. Non-limiting examples of shaped ceramic abrasive particles include shaped abrasive particles, such as triangular plates, or elongated ceramic rods/filaments. Shaped ceramic abrasive particles are generally homogenous or substantially uniform and maintain their sintered shape without the use of a binder such as an organic or inorganic binder that bonds smaller abrasive particles into an agglomerated structure and excludes abrasive particles obtained by a crushing or comminution process that produces abrasive particles of random size and shape. In many embodiments, the shaped ceramic abrasive particles comprise a homogeneous structure of sintered alpha alumina or consist essentially of sintered alpha alumina. Shaped abrasive particles as described herein can include any number of shape features. The shape features can help to improve the cutting performance of any of shaped abrasive particles. Examples of suitable shape features include an opening, a concave surface, a convex surface, a groove, a ridge, a fractured surface, a low roundness factor, or a perimeter comprising one or more corner points having a sharp tip. Individual shaped abrasive particles can include any one or more of these features.

As noted in the background section above, it has been found that areas where the cavities of production tooling are inconsistent, such as at the location of the thermal splicing of the ends of the production tooling or at sewn seams leads to inconsistencies and defects in the resulting coated abrasive article. By way of example, FIG. 1 illustrates a coated abrasive article 100 having defects at the positions of a thermal splice 110 of the production tooling. As can be seen, the shaped abrasive particles do not transfer consistently at the positions of the thermal splice 110 leaving areas with few or no shaped abrasive particles. It is desired to minimize such defects without having to modify the production tooling.

Figure 2A:
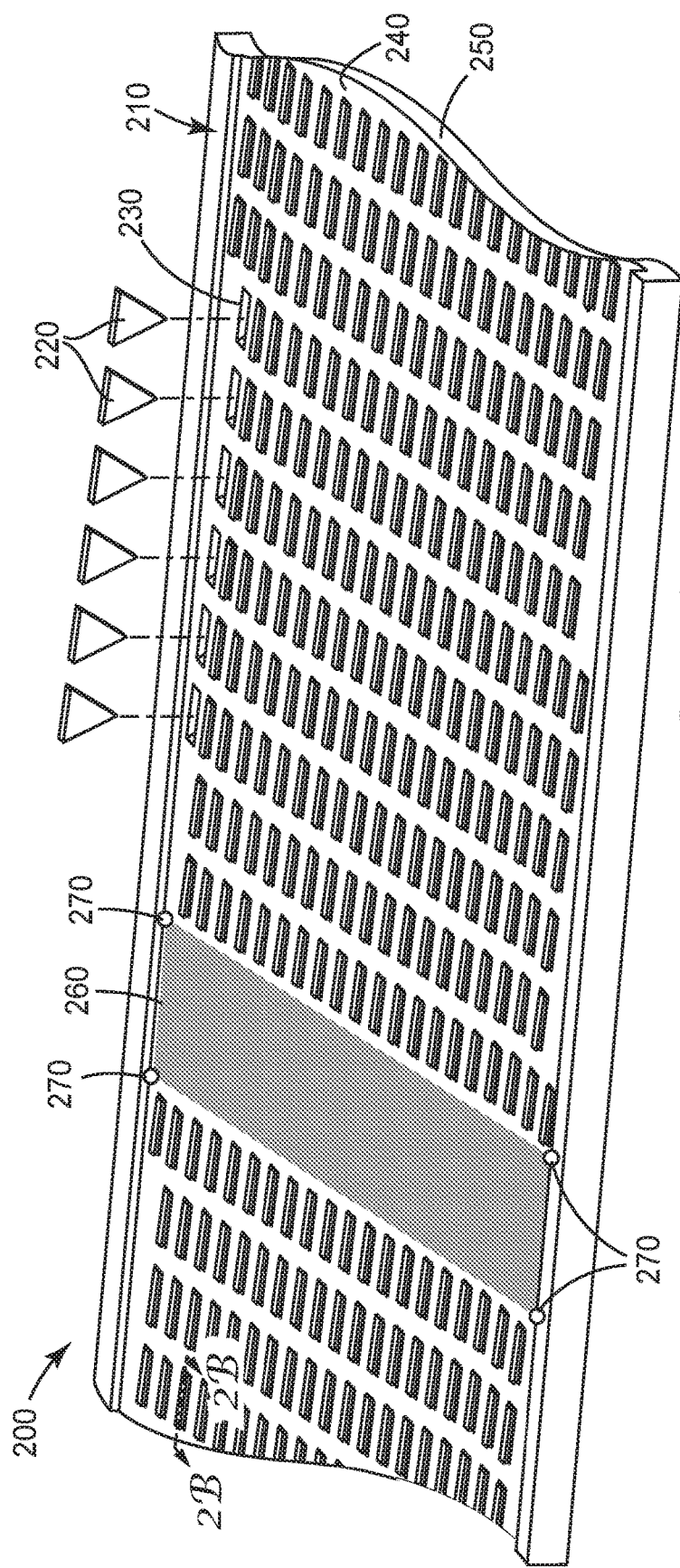
FIG. 2A illustrates a schematic perspective view of an exemplary production tooling having a thermal splicing zone in a sample embodiment.
Figure 2B:
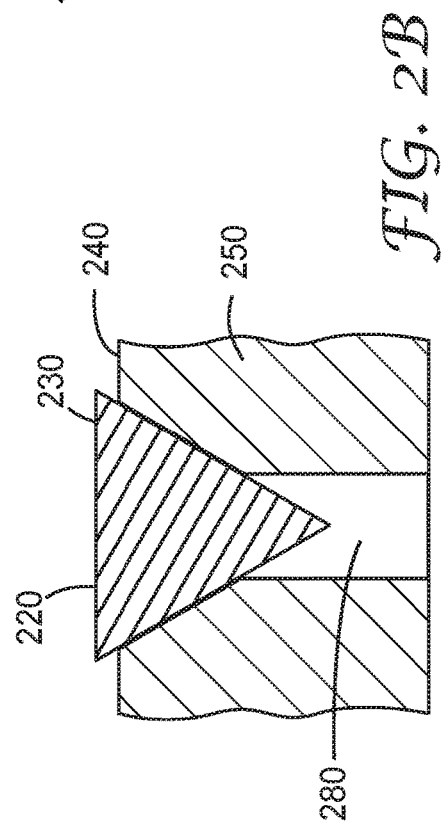
FIG. 2B is a schematic cross-sectional side view of the positioning of an abrasive article in a cavity of the production tooling of FIG. 2A, taken along plane 2B-2B.

FIG. 2A illustrates a schematic perspective view of an exemplary production tooling having a thermal splicing zone in a sample embodiment. As shown in FIG. 2A, the abrasive particle positioning system 200 includes production tooling 210 and shaped abrasive particles 220. In FIG. 2A, the shaped abrasive particles 220 are illustrated as an equilateral tri angle conforming to a truncated pyramid, although other shapes are certainly possible and within the scope of the present description. The shaped abrasive particles 220 are disposed partially or fully recessed within cavities 230 in a dispensing surface 240 of carrier member 250 of the production tooling 210 as shown in FIG. 2B, which is a schematic cross-sectional side view of the positioning of an abrasive article 220 in a cavity 230 of the production tooling 210 of FIG. 2A, taken along plane 2B-2B. As illustrated, the plurality of cavities 230 have a complimentary shape to intended shaped abrasive particle 220 to be contained therein whereby the shaped abrasive particles 220 protrude slightly from the respective cavities 230 as illustrated in FIG. 28. As also illustrated in FIG. 2A, the production tooling 210 may have a thermal splicing zone 260 where the cavities 230 have been partially or completely destroyed by the thermal splicing of the ends of the carrier member 250 when forming the carrier member 250 into an endless belt. The production tooling 210 optionally may contain metal beads 270 that mark the beginning and end of the thermal splicing zone 260. As will be explained below, the metal beads 270 may be detected by a magnet of a detecting means to mark the beginning and end of the thermal splicing zone 260. As also explained below, the metal beads 270 may be used to mark a pattern transition zone even in the absence of a thermal splicing zone 260.

Figure 3A:
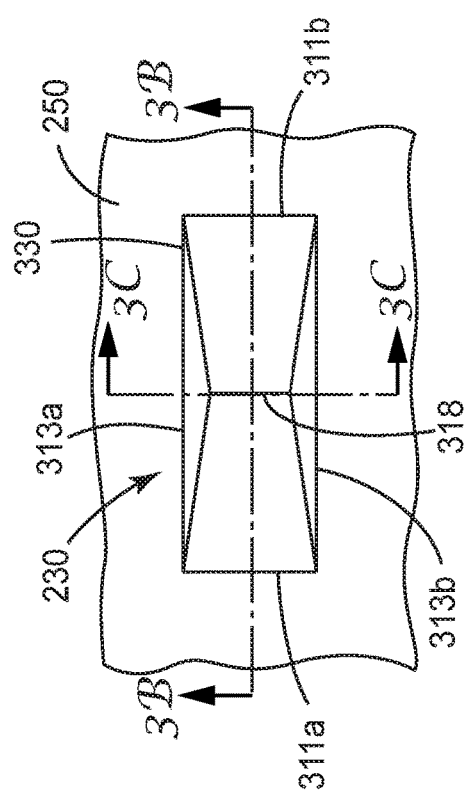
FIG. 3A is an enlarged schematic top view of an exemplary cavity design suitable for use as the cavities of the production tooling in sample embodiments.
Figure 3C:
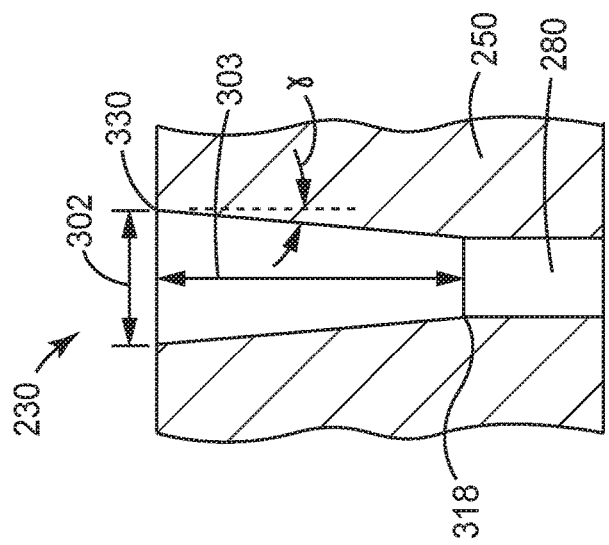
FIG. 3C is a cross-sectional view of FIG. 3A taken along plane 3C-3C.
Figure 3B:
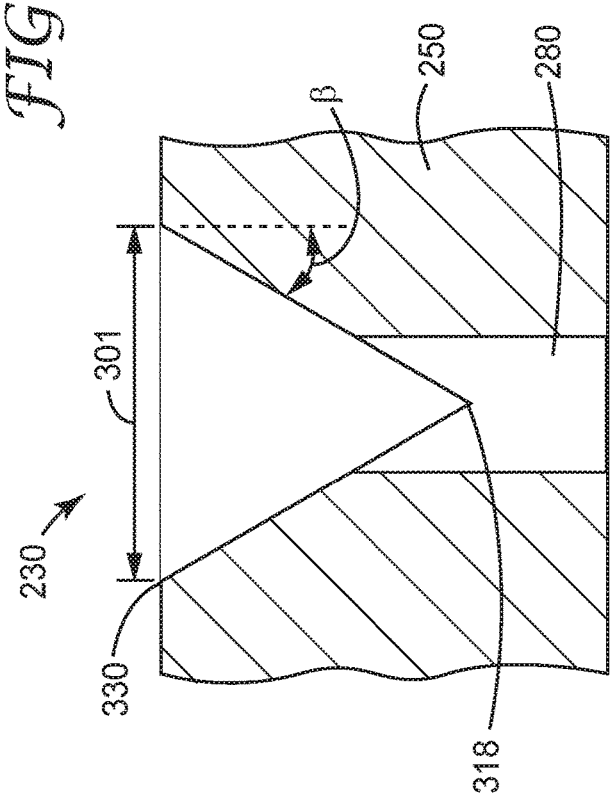
FIG. 3B is a cross-sectional view of FIG. 3A taken along plane 3B-3B.

An embodiment of a cavity 230 for accepting shaped abrasive particles 220 is shown in FIGS. 3A-3C. As illustrated, an exemplary cavity 230 in carrier member 250 has length 301 (FIG. 3B), width 302 (FIG. 3C), and depth 303

(FIG. 3C). Cavity 230 comprises four sidewalls 311a, 311b, 313a, 313b. Sidewalls 311a, 311b extend from openings 330 at dispensing surface 240 of carrier member 250 and taper inward at a taper angle β with increasing depth until they meet at line 318 (see FIG. 3B). Likewise, sidewalls 313a, 313b taper inwardly at a taper angle γ with increasing depth until they contact line 318 (see FIGS. 3A and 3C).

Taper angles β and γ will typically depend on the specific shaped abrasive particles 220 selected for use with the production tooling 210, preferably corresponding to the shape of the shaped abrasive particles 220. In this embodiment, taper angle β may have any angle greater than 0 and less than 90 degrees. In some embodiments, taper angle β has a value in the range of 40 to 80 degrees, preferably 50 to 70 degrees, and more preferably 55 to 65 degrees. Taper angle γ will likewise typically depend on the shape of the shaped abrasive particles 220 that are selected. In this embodiment, taper angle γ may have any angle in the range of from 0 to 30 degrees. In some embodiments, taper angle γ has a value in the range of 5 to 20 degrees, preferably 5 to 15 degrees, and more preferably 8 to 12 degrees.

In some embodiments, the cavities 230 are open at both the dispensing and the back surfaces. In some of these embodiments, the first and third sidewalls 311a, 313a do not contact each other and the second and fourth sidewalls 311b, 313b do not contact each other.

Figure 4:
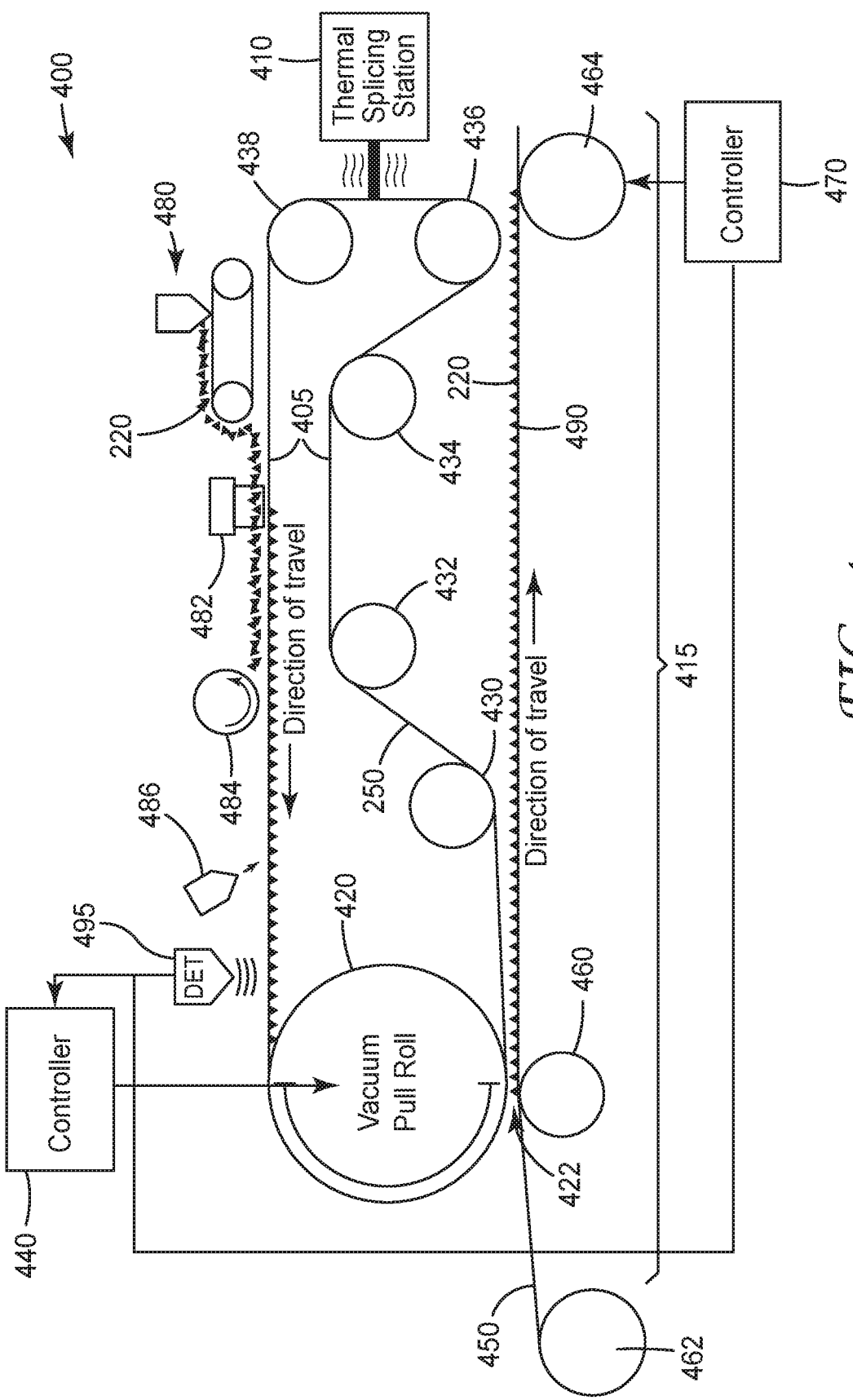
FIG. 4 is a schematic view of an apparatus for making a coated abrasive article according to sample embodiments.

FIG. 4 is a schematic view of an apparatus 400 for making a coated abrasive article according to sample embodiments. Coated abrasive article maker 400 according; to the present disclosure includes shaped abrasive particles 220 removably disposed within cavities 230 of production tooling 210 having first web path 405 guiding production tooling 210 through coated abrasive article maker 400. In sample embodiments, the ends of the carrier member 250 of the production tooling 210 are spliced together using, for example, a thermal splicing station 410 so that the carrier member 250 forms the first web path 405 as an endless loop. A vacuum pull roll 420 rotates counterclockwise in the view of FIG. 4 to apply a vacuum to hold the shaped abrasive particles 220 against the vacuum pull roll 420 and to advance the endless loop. The carrier member 250 is guided over idler rolls 430, 432, 434, 436, and 438 in the indicated direction of travel to move the production tooling 210 with cavities 230 in the endless production loop.

In sample embodiments, the production tooling 210 is moved past an abrasive particle feeder 480 that supplies at least some shaped abrasive particles 220 to the production tooling 210 as illustrated. Preferably, the abrasive particle feeder 480 supplies an excess of shaped abrasive particles 220 such that there are more shaped abrasive particles 220 present per unit length of the production tooling 210 in the machine direction than cavities 230 present. Supplying an excess of shaped abrasive particles 220 helps to ensure that all cavities within the production tooling 210 are eventually filled with a shaped abrasive particle 220. Since the bearing area and spacing of the shaped abrasive particles 220 is often designed into the production tooling 210 for the specific grinding application, it is generally desirable to not have too many unfilled cavities 230. The abrasive particle feeder 480 is typically the same width as the production tooling 210 and supplies shaped abrasive particles 220 across the entire width of the production tooling 210. The abrasive particle feeder 480 can be, for example, a vibratory feeder, a hopper, a chute, a silo, a drop coater, or a screw feeder.

Optionally, a filling assist member 482 and/or 484 is provided after the abrasive particle feeder 480 to move the shaped abrasive particles 220 around on the dispensing surface 240 of the production tooling 210 and to help orientate or slide the shaped abrasive particles 220 into the cavities 230. The filling assist member 482 and/or 484 can be, for example, a doctor blade, a felt wiper, a brush having a plurality of bristles, a vibration system, a blower or air knife, a vacuum box, or combinations thereof. The filling assist member 482 and/or 484 moves, translates, sucks, or agitates the shaped abrasive particles 220 on the dispensing surface 240 to place more shaped abrasive particles 220 into the cavities 230. Without the filling assist member 482 and/or 484, generally at least some of shaped abrasive particles 220 dropped onto the dispensing surface 240 will fall directly into a cavity 230 and no further movement is required but others may need some additional movement to be directed into a cavity 230. Optionally, the filling assist member 482 and/or 484 can be oscillated laterally in the cross-machine direction or otherwise have a relative motion such as circular or oval to the surface of the production tooling 210 using a suitable drive to assist in completely filling each cavity 230 in the production tooling 210 with a shaped abrasive particle 220. Typically, if a brush is used as the filling assist member 482 and/or 484, the bristles may cover a section of the dispensing surface 240 from 2-4 inches (5.0-10.2 cm) in length in the machine direction preferably across all or most all of the width of the dispensing surface 240 and lightly rest on or just above the dispensing surface 240 and be of a moderate flexibility. The production tooling 210 may be supported or pushed on by a shoe or a plate to assist in keeping it planar in the portion of the apparatus 400 where the shaped abrasive particles 220 are dispensed or else a vacuum box may be disposed beneath the production tooling 210 in this portion of the apparatus 400. It will be appreciated by those skilled in the art that where the shaped abrasive particle 220 is fully contained within the cavity 230 of the production tooling 210, that is to say where the majority (e.g., 80, 90, or 95 percent) of the shaped abrasive particles 220 in the cavities 230 do not extend past the dispensing surface 240 of the production tooling 210, it is easier for the filling assist member 482 and/or 484 to move the shaped abrasive particles 220 around on the dispensing surface 240 of the production tooling 210 without dislodging an individual shaped abrasive particle 220 already contained within an individual cavity 230.

Optionally, as the production tooling 210 advances in the direction of travel, the cavities 230 move to a higher elevation and can optionally reach a higher elevation than the outlet of the abrasive particle feeder 480 for dispensing shaped abrasive particles 220 onto the dispensing surface 240 of the production tooling 210. In the illustrated embodiment where the production tooling 210 is spliced into an endless belt, the belt can have a positive incline to advance to a higher elevation as it moves past the abrasive particle feeder 480. On the other hand, if the production tooling 210 is a roll, the abrasive particle feeder 480 can be positioned such that it applies the shaped abrasive particles 220 to the roll before top dead center of the roll's outer circumference such as between 270 degrees to 350 degrees on the face of the roll with top dead center being 0 degrees as one progresses clockwise about the roll with the roll turning in a clockwise in operation. In any case, by applying the shaped abrasive particles 220 to an inclined dispensing surface 240 the production tooling 210 can enable better filling of the cavities 230 as the shaped abrasive particles 220 can slide or tumble down the inclined dispensing surface 240 of the production tooling 210 thereby enhancing the possibility of falling into a cavity 230. In embodiments where the shaped abrasive particle 220 is fully contained within the cavity 230 of the production tooling 210, that is to say where the majority (e.g., 80, 90, or 95 percent) of the shaped abrasive particles 220 in the cavities 230 do not extend past the dispensing surface 240 of the production tooling 210, the incline can also assist in removing excess shaped abrasive particles 220 from the dispensing surface 240 of the production tooling 210 since excess shaped abrasive particles 220 can slide off the dispensing surface 240 of the production tooling 210. The incline may be between zero degrees up to an angle where the shaped abrasive particles 220 begin to fall out of the cavities 230. The preferred incline will depend on the shaped abrasive particle 220 shape and the magnitude of the force (e.g., friction or vacuum) holding the shaped abrasive particle 220 in the cavity 230. In some embodiments, the positive incline is in a range of from +10 to +80 degrees, or from +10 to +60 degrees, or from +10 to +45 degrees.

Optionally, an abrasive particle removal member 486 may be provided to assist in removing the excess shaped abrasive particles 220 from the dispensing surface 240 of the production tooling 210 once most or all of the cavities 230 have been filled by a shaped abrasive particle 220. The abrasive particle removal member 486 may be, for example, a source of air to blow the excess shaped abrasive particles 220 off the dispensing surface 240 of the production tooling 210 such as an air wand, air shower, air knife, a coanda effect nozzle, or a blower. A contacting device also may be used as the abrasive particle removal member 486 such as a brush, a scraper, a wiper, or a doctor blade. A vibrator, such as an ultrasonic horn, also may be used as the abrasive particle removal member 486. Alternatively, a vacuum source such as vacuum box or vacuum pull roll 420 located along a portion of the first web path after the abrasive particle feeder 480 can be used to hold the shaped abrasive particles 220 in the cavities 230. In this span or section of the first web path 405, the dispensing surface 240 of the production tooling 210 can be inverted or have a large incline or decline approaching or exceeding 90 degrees to remove the excess shaped abrasive particles 220 using the force of gravity to slide or drop them from the dispensing surface 240 while retaining the shaped abrasive particles 220 disposed in the cavities 230 by vacuum until the dispensing surface 240 is returned to an orientation to keep the shaped abrasive particles 220 in the cavities 230 due to the force of gravity or they are released from the cavities 230 onto the resin coated backing at dispensing point 422 as illustrated in FIG. 4. In embodiments where the shaped abrasive particle 220 is fully contained within the cavity 230 of the production tooling 210, that is to say where the majority (e.g., 80, 90, or 95 percent) of the shaped abrasive particles 220 in the cavities 230 do not extend past the dispensing surface 240 of the production tooling 210, the abrasive particle removal member 486 can slide the excess shaped abrasive particles 220 across the dispensing surface 240 of the production tooling 210 and off of the production tooling 210 without disturbing the shaped abrasive particles 220 contained within the cavities 230. The removed excess shaped abrasive particles 220 can be collected and returned to the abrasive particle feeder 480 for reuse. The excess shaped abrasive particles 220 can alternatively be moved in a direction opposite to the direction of travel of the production tooling 210 past or towards the abrasive particle feeder 480 where they may fill unoccupied cavities 230.

In the embodiment of FIG. 4, the vacuum pull roll 420 pulls the production tooling 210 towards the resin coated backing 450. The elevation of the production tooling 210 in this section is not particularly important as long as the shaped abrasive particles 220 are retained in the cavities 230 and the production tooling 210 could continue to incline, decline, or travel horizontally. Choice of the positioning is often determined by existing space within the machine if retrofitting an existing coated abrasive particle manufacturing apparatus 400. The vacuum pull roll 420 uses a vacuum to hold the shaped abrasive particles 220 in the cavities 230 of the production tooling 210 until the shaped abrasive particles 220 reach the dispensing point 422, at which time the vacuum is released and the shaped abrasive particles 220 fall by the force of gravity onto the resin coated backing 450. It will be appreciated by those skilled in the art that various methods can be employed to transfer the shaped abrasive particles 220 from cavities 230 of the production tooling 210 to the resin coated backing 450.

One method for transferring the shaped abrasive particles includes a pressure assist method where each cavity 220 in production tooling 200 has two open ends or the back surface or the entire production tooling 210 is suitably porous and the vacuum pull roll 420 has a plurality of apertures and an internal pressurized source of air. With pressure assist, production tooling 210 does not need to be inverted but it still may be inverted. Vacuum pull roll 420 can also have movable internal dividers such that the pressurized air can be supplied to a specific arc segment or circumference of the roll to blow shaped abrasive particles 220 out of the cavities 230 and onto the resin coated backing 450 at the deposit point 422. The vacuum pull roll 420 may also be provided with an internal source of vacuum without a corresponding pressurized region or in combination with the pressurized region typically prior to the pressurized region as the vacuum pull roll 420 rotates. The vacuum source or region can have movable dividers to direct it to a specific region or arc segment of the vacuum pull roll 420. The vacuum can suck shaped abrasive particles 220 firmly into cavities 230 via opening 280 as the production tooling 210 wraps around the vacuum pull roll 420 before subjecting the shaped abrasive particles 220 to the pressurized region of the vacuum pull roll 420. This vacuum region be used, for example, with shaped abrasive particle removal member 486 to remove excess shaped abrasive particles 220 from dispensing surface 240 or may be used to simply ensure shaped abrasive particles 220 do not leave cavities 230 before reaching the deposit point. Those skilled in the art will further appreciate that gravity assist, pushing assist, vibration assist, or a combination of such methods may also be used. Further descriptions of these techniques may be found in U.S. Patent Publication No. 2016/0311081, to 3M Company, St. Paul MN, the contents of which are incorporated herein by reference.

In sample embodiments, the resin coated backing 450 is provided to the coated abrasive particle manufacturing apparatus 400 by a guide apparatus including unwind roller 462, one or more idler rolls 460, and a pull roll 464. The resin coated backing 450 may be formed by a make coat delivery system and a make coat applicator (not shown) using methods well-known to those skilled in the art. Suitable unwinds, make resins, coaters and backcoat delivery systems, and make coatings are also known to those of skill in the art. The make coat delivery system can be a simple pan or reservoir containing the make coat resin or a pumping system with a storage tank and delivery plumbing to translate the make coat resin to the needed location. The backing sheet can be a cloth, paper, film, nonwoven, scrim, or other web substrate. The make coat applicator can be, for example, a coater, a roll coater, a spray system, or a rod coater. Alternatively, a precoated coated backing can be positioned by the idler roll 460 for application of the shaped abrasive particles 220 to top surface of the precoated coated backing.

Together, such components unwind a backing sheet, deliver a make coat resin via the make coat delivery system to a make coat applicator and apply a make coat resin to a surface of the backing sheet to form the resin coated backing 450. Thereafter, the resin coated backing 450 positioned by idler roll 460 for application of the shaped abrasive particles 220 to the resin coated surface of the resin coated backing 450 to form the coated abrasive article 490 including the deposited shaped abrasive particles 220. A second web path 415 for the resin coated backing 450 through the coated abrasive article maker apparatus 400 may further include a pull roll 464 the pulls the coated abrasive article 490 in the indicated direction of travel through the coated abrasive article maker apparatus 400. Together, the idler rolls 460, unwind rolls 462, and pull roll 464 guide the resin coated backing 450 through the coated abrasive article maker apparatus 400.

After the depositing point 422, the production tooling 210 travels along the first web path 405 back towards the abrasive particle filler 480 and filling assist members 482 and 484 with the assistance of idler rolls 430, 432, 434, 436, and 438 as necessary. An optional production tooling cleaner (not shown) can be provided to remove stuck shaped abrasive particles 220 still residing in the cavities 230 and/or to remove make coat resin transferred to the dispensing surface 240. Choice of the production tooling cleaner will depend on the configuration of the production tooling 210 and could be either alone or in combination, an additional air blast, solvent or water spray, solvent or water bath, an ultrasonic horn, or an idler roll the production tooling wraps to use push assist to force the shaped abrasive particles 220 out of the cavities 230. Thereafter the endless belt of production tooling 210 advances to the abrasive particle filler 480 and filling assist members 482 and 484 to be filled with new shaped abrasive particles 220.

Similarly, various idler rolls may be used to guide the coated abrasive article 490 having a predetermined, reproducible, non-random pattern of shaped abrasive particles 220 on a first major surface that were applied at the depositing point 422 and held onto the first major surface of the resin coated backing 450 by the make coat resin along the second web path into an oven for curing the make coat resin. Optionally, a second abrasive particle coater can be provided to place additional shaped abrasive particles 220, such as another type of abrasive particle or diluents, onto the make coat resin prior to the oven. The second abrasive particle coater can be a drop coater, spray coater, or an electrostatic coater as known to those of skill in the art. Thereafter, the cured coated abrasive article 490 can enter into an optional festoon along the second web path prior to further processing such as the addition of a size coat, curing of the size coat, and other processing steps known to those of skill in the art of making coated abrasive articles.

In some embodiments, the speed of the dispensing surface 240 of the production tooling 210 and the speed of the resin coated backing 450 are speed matched to each other within +10 percent, ±5 percent, or +1 percent, for example. This permits the positioning of each shaped abrasive particle 220 onto the resin coated backing 450 to substantially reproduce the pattern of shaped abrasive particles 220 and their specific orientation as arranged in the production tooling 210. However, it is desired in sample embodiments to modify the relative speeds of the dispensing surface 240 of the production tooling 210 and the resin coated backing 450 so that patterns of shaped abrasive particles 220 having different densities may be formed on the resin coated backing 450 and, in particular, to adjust the relative speeds such that any gaps in filled cavities 230 in the production tooling 210 do not translate to gaps in shaped abrasive particles 220 on the coated abrasive article 490 of the type illustrated at 110 in FIG. 1.

In sample embodiments, the relative speeds of the dispensing surface 240 of the production tooling 210 and the speed of the resin layer of resin coated backing 450 are adjusted by controllers 440 and 470, respectively, to dispense the shaped abrasive particles 220 from the production tooling 210 to the resin coated backing 450 with the desired density without modifying the production tooling 210. For example, if a denser pattern of shaped abrasive particles 220 is desired for the coated abrasive article 490, the resin coated backing 450 would be slowed down relative to the production tooling 210 by using controller 470 to slow the speed of the pull roll 464 relative to the speed of the vacuum pull roll 420 and/or by using the controller 440 to speed up the vacuum pull roll 420 relative- to the speed of the pull roll 464. It will be appreciated that the density of the shaped abrasive particles 220 on the coated abrasive article 490 may be likewise reduced by having the controller 470 slow the speed of the pull roll 420 relative to the speed of the resin coated backing 450 or to have the controller 470 speed up the resin coated backing 450 relative to the speed of the production tooling 210. The controllers 440 and 470 may be a single controller used to control both vacuum pull roll 420 and pull roll 464 in an alternative embodiment. A control knob also may be provided to enable the operator of the coated abrasive article maker apparatus 400 to control the relative speeds of the vacuum pull roll 420 and the pull roll 464 to create patterns of different densities of shaped abrasive particles 220 as desired. Thus, in sample embodiments, the controllers 440 and 470 may adjust the relative speeds of the dispensing surface 240 of the production tooling 210 and the speed of the resin layer of resin coated backing 450 to create patterns of shaped abrasive particles 220 of different densities on the coated abrasive article 490.

In further sample embodiments, the controllers 440 and 470 may substantially eliminate the defects caused by the splicing and sewing of the production tooling 210 by using detecting means 495 to detect the splicing zone 260 (FIG. 2A) and causing the controller 440 to speed up the production tooling 210 by adjusting the speed of the vacuum pull roll 420 and/or by causing the controller 470 to slow down the resin coated backing 450 by slowing down the pull roll 464 using, for example, a clutch and brake mechanism in sample embodiments, such detecting means 495 may comprise a vision system that visually recognizes a pattern transition zone where the abrasive particle density is to change or a splice zone 260 on the production tooling 210. Alternatively, the detecting means 495 also may comprise a magnet that recognizes metal beads 270 embedded into the production tooling 210 to mark the pattern transition zone or splice zone 260. The detecting means may be a zero position on the abrasive article maker 400 when the endless belt including the production tooling 210 is installed. In this case, the position of the pattern transition or splicing zone 260 would be determined relative to the zero position at installation. The detecting means may further comprise an encoder or other means of keeping track of lineal or rotational position of the moving production tooling 210 and/or resin coated backing 450 that can be used to track the positions of the production tooling 210 and/or resin coated backing 450 with respect to time. For example, a timing belt may be used to measure a position of the pattern transition zone as the endless belt rotates in the direction of travel. In sample embodiments, the timing belt measures a position of the pattern transition zone or the splice zone as the endless belt rotates in the direction of travel, where the timing belt provides timing signals representing time t1 at the start of the pattern transition zone or the splice zone 260 and time t2 at the end of the pattern transition zone or the splice zone 260. Thus, the pattern transition zone and/or splice zone detection data comprises times t1 and t2 marking the beginning and end of the pattern transition zone or splice zone, respectively, and the controllers 440 and 470 control for a time t2−t1 the relative speeds of rotation of the vacuum pull roll 420 and the pull roll 464 in anticipation of the time the pattern transition zone or splice zone passes the deposit point 422.

Figure 5:
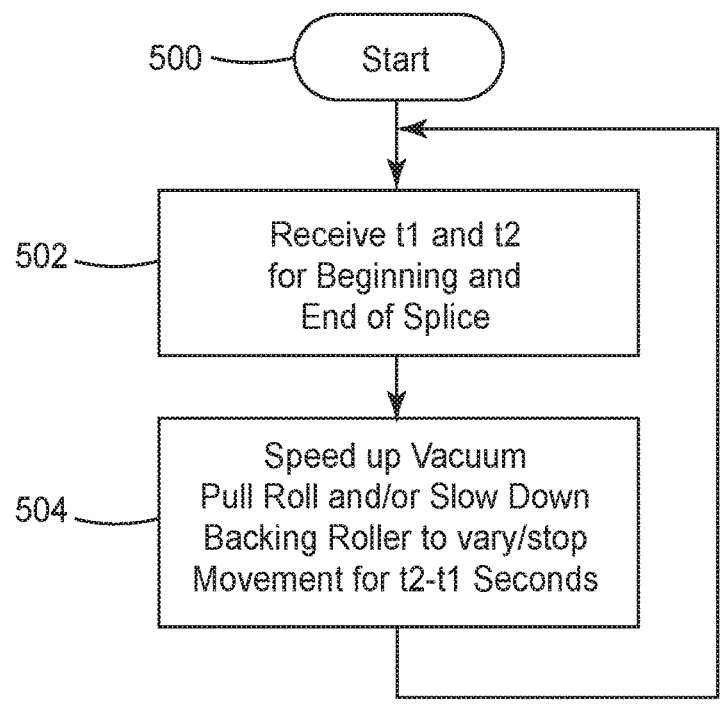
FIG. 5 illustrates a simplified flow chart of a method for identifying the thermal splicing zone and adjusting the speed of the vacuum pull roll and/or backing roller to vary or stop relative movement of the production tooling and the resin layer coated backing as the splicing zone passes a deposit point of the shaped abrasive particles onto the resin coated backing in a sample embodiment.

FIG. 5 illustrates a simplified flow chart of a method for a controller such as controller 440 and/or controller 470 to identify the thermal splicing zone 260 and to adjust the speed of the vacuum pull roll 420 and/or backing pull roll 464 to vary or stop relative movement of the production tooling 210 and the resin coated backing 450 as the splicing zone 260 passes the deposit point 422 of the shaped abrasive particles 220 onto the resin coated backing 450 in a sample embodiment. In this example, the controller 440 and/or controller 470 is programmed to start at 500 and to receive at 502 splice zone detection data in the form of times t1 and t2 representing the beginning and end of the splice zone 260. The detecting means 495 may correlate the timing data to absolute time and/or to an encoder and/or timing belt that tracks the movement of the production tooling 210 and/or the resin coated backing 450. In either case, the generated times t1 and t2 are provided to the controller 440 and/or controller 470 whereby the controller 440 and/or controller 470 may speed up the vacuum pull roll 420 and/or slow down or stop the pull roll 464 to slow down or stop the resin coated backing 450 for the t2−t1 time duration at 504. As described above, this adjustment of the relative speeds of the vacuum pull roll 420 and the pull roll 464 substantially prevents the formation of defects that would otherwise be caused by the splice zone 260 of the endless roll of the production tooling 210.

Figure 6:
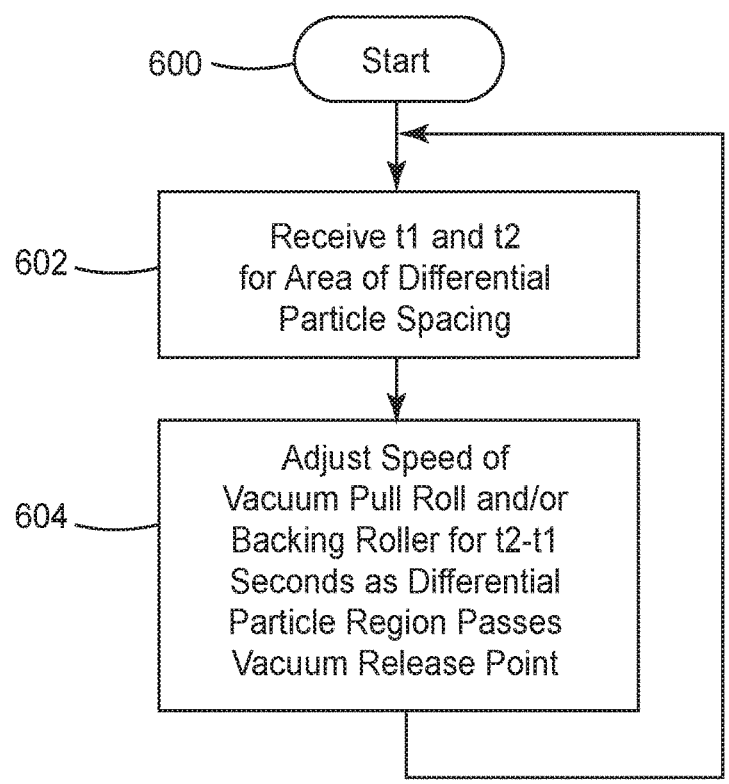
FIG. 6 illustrates a simplified flow chart of a method for identifying an area for differential particle spacing and adjusting the relative speeds of the vacuum pull roll and backing roller to vary the density of shaped abrasive particles transferred to the resin coated backing in the identified area for shaped abrasive particle pattern creation in a sample embodiment.

FIG. 6 illustrates a simplified flow chart of a method for a controller such as controller 440 and/or controller 470 to identify an area for differential particle spacing and to adjust the relative speeds of the vacuum pull roll 420 and pull roll 464 to vary the density of shaped abrasive particles 220 transferred to the resin coated backing 450 in the identified area for abrasive particle pattern creation in a sample embodiment. In this example, the controller 440 and/or controller 470 is programmed to start at 600 and to receive at 602 pattern transition zone detection data in the form of times t1 and t2 representing the beginning and end of the pattern transition zone for a predetermined pattern to be created. As in the example of FIG. 5, the detecting means 495 may correlate the timing data to absolute time and/or to an encoder and/or timing belt that tracks the movement of the production tooling 210 over time. In either case, the generated times t1 and t2 are provided to the controller 440 and/or controller 470 whereby the controller 440 and/or controller 470 may adjust the relative speeds of the vacuum pull roll 420 and pull roll 464 to cause denser or sparser deposits of shaped abrasive particles 220 in corresponding portions of the resin coated backing 450 for the t2−t1 time duration at 604 as the production tooling 210 and resin coated backing layer pass through the deposit area 422. As described above, this adjustment of the relative speeds of the vacuum pull roll 420 and the pull roll 464 adjusts the density of the shaped abrasive particles 220 in the corresponding portion of the coated abrasive article 490.

Figure 7:
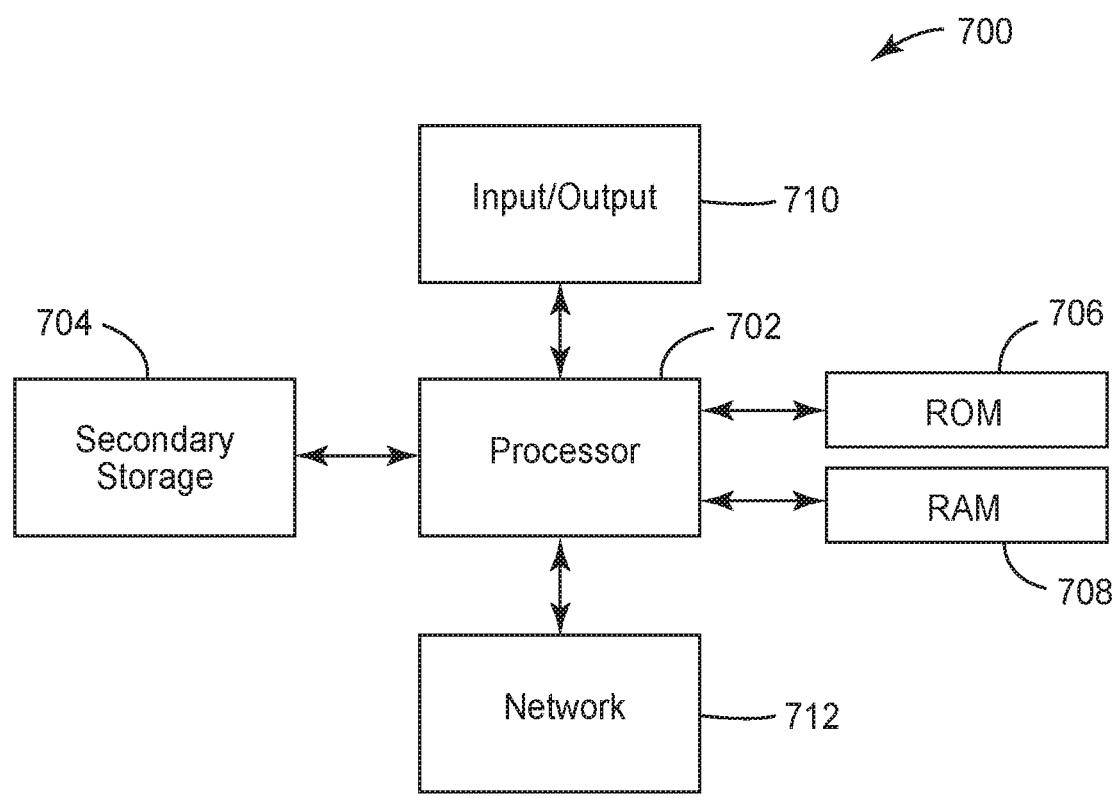
FIG. 7 illustrates a general-purpose computer that may be programmed into a special purpose computer suitable for implementing one or more embodiments of the system described in sample embodiments.

FIG. 7 illustrates a general-purpose computer that may be programmed into a special purpose computer suitable for implementing one or more embodiments of the system described in sample embodiments. In particular, the controllers 440 and 470 described above may be implemented on any general-purpose processing component, such as a computer with sufficient processing power, memory resources, and communications throughput capability to handle the necessary workload placed upon it. The processing component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 70 may be used to store programs that are loaded into RAM 70 when such programs are selected for execution. The ROM 70 is used to store instructions and perhaps data that are read during program execution. ROM 70 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

The devices described herein can be configured to include computer-readable non-transitory media storing computer readable instructions and one or more processors coupled to the memory, and when executing the computer readable instructions configure the processing component 700 to perform method steps and operations described above with reference to FIGS. 4-6. The computer-readable non-transitory media includes all types of computer readable media, including magnetic storage media, optical storage media, flash media and solid-state storage media.

It should be further understood that software including one or more computer-executable instructions that facilitate processing and operations as described above with reference to any one or all of steps of the disclosure can be installed in and sold with one or more devices within consumer and/or producer domains consistent with the disclosure. Alternatively, the software can be obtained and loaded into one or more devices within consumer and/or producer domains consistent with the disclosure, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiment shown in FIG. 7 can be implemented, at least in part, in digital electronic circuitry, analog electronic circuitry, or in computer hardware, firmware, software, or in combinations of them. These components also can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the disclosed methods can be easily construed as within the scope of the claims by programmers skilled in the art to which the present disclosure pertains. Method steps associated with the illustrative embodiments can be performed by one or more programmable processors executing a computer program, code or instructions to perform functions (e.g., by operating on input data and/or generating an output). Method steps can also be performed by, and apparatus can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by or incorporated in special purpose logic circuitry.

Those skilled in the art understand that information and signals may be represented using any of a variety of different technologies and techniques. For example, data, instructions, commands, information, signals, bits, symbols, and chips that may be referenced in the above description may be represented by voltages, currents, electromagnetic waves, magnetic fields or particles, optical fields or particles, or any combination thereof.

Those skilled in the art further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors, such that the instructions, when executed by one or more processors cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

Although coated abrasive article maker 400 is shown and described herein as including a production tooling 210 in the form of an endless belt, it is possible in some alternative embodiments for coated abrasive article maker 400 to include production tooling 210 on the vacuum pull roll 420. For example, vacuum pull roll 420 could include a plurality of cavities 230 to which shaped abrasive particles 220 are directly fed. Shaped abrasive particles 220 would be selectively held in place with a vacuum, which can be disengaged to release the shaped abrasive particles 220 onto the resin coated backing 450. Further details of the coated abrasive article maker 400 and suitable alternatives may be found in U.S. Patent Publication No. 2016/0311081incorporated by reference above.

Also, it will be appreciated that the shaped abrasive particles 220 described herein can be formed in many suitable ways. For example, the shaped abrasive particles 220 can be made according to a multi-operation process. The process can be carried out using any material or precursor dispersion material. Briefly, for embodiments where the shaped abrasive particles 220 are monolithic ceramic particles, the process can include the operations of making either a seeded or non-seeded precursor dispersion that can be converted into a corresponding (e.g., a boehmite sol-gel that can be converted to alpha alumina); filling one or more mold cavities having the desired outer shape of shaped abrasive particles 220 with a precursor dispersion; drying the precursor dispersion to form precursor shaped abrasive particle 220; removing the precursor shaped abrasive particles 220 from the mold cavities; calcining the precursor shaped abrasive particles 220 to form calcined, precursor shaped abrasive particles 220; and then sintering the calcined, precursor shaped abrasive particles 220 to form shaped abrasive particles 220. The process will now be described in greater detail in the context of alpha-alumina-containing shaped abrasive particles 220. In other embodiments, the mold cavities may be filled with a melamine to form melamine shaped abrasive particles 220.

The process can include the operation of providing either a seeded or non-seeded dispersion of a precursor that can be converted into ceramic. In examples where the precursor is seeded, the precursor can be seeded with an oxide of an iron (e.g., FeO). The precursor dispersion can include a liquid that is a volatile component. In one example, the volatile component is water. The dispersion can include a sufficient amount of liquid for the viscosity of the dispersion to be sufficiently low to allow filling mold cavities and replicating the mold surfaces, but not so much liquid as to cause subsequent removal of the liquid from the mold cavity to be prohibitively expensive. In one example, the precursor dispersion includes from 2 percent to 90 percent by weight of the particles that can be converted into ceramic, such as particles of aluminum oxide monohydrate (boehmite), and at least 10 percent by weight, or from 50 percent to 70 percent, or 50 percent to 60 percent, by weight, of the volatile component such as water. Conversely, the precursor dispersion in some embodiments contains from 30 percent to 50 percent, or 40 percent to 50 percent solids by weight.

Examples of suitable precursor dispersions include zirconium oxide sols, vanadium oxide sols, cerium oxide sols, aluminum oxide sols, and combinations thereof. Suitable aluminum oxide dispersions include, for example, boehmite dispersions and other aluminum oxide hydrates dispersions.

Boehmite can be prepared by known techniques or can be obtained commercially. Examples of commercially available boehmite include products having the trade designations "DISPERAL" and "DISPAL", both available from Sasol North America, Inc., or "HIQ-40" available from BASF Corporation. These aluminum oxide monohydrates are relatively pure; that is, they include relatively little, if any, hydrate phases other than monohydrates, and have a high surface area.

The physical properties of the resulting shaped abrasive particles 220 can generally depend upon the type of material used in the precursor dispersion. As used herein, a "gel" is a three-dimensional network of solids dispersed in a liquid.

The precursor dispersion can contain a modifying additive or precursor of a modifying additive. The modifying additive can function to enhance some desirable property of the shaped abrasive particles 220 or increase the effectiveness of the subsequent sintering step. Modifying additives or precursors of modifying additives can be in the form of soluble salts, such as water-soluble salts. They can include a metal-containing compound and can be a precursor of an oxide of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, and mixtures thereof. The particular concentrations of these additives that can be present in the precursor dispersion can be varied.

The introduction of a modifying additive or precursor of a modifying additive can cause the precursor dispersion to gel. The precursor dispersion can also be induced to gel by application of heat over a period of time to reduce the liquid content in the dispersion through evaporation. The precursor dispersion can also contain a nucleating agent. Nucleating agents suitable for this disclosure can include fine particles of alpha alumina, alpha ferric oxide or its precursor, titanium oxides and titanates, chrome oxides, or any other material that will nucleate the transformation. The amount of nucleating agent, if used, should be sufficient to effect the transformation of alpha alumina.

A peptizing agent can be added to the precursor dispersion to produce a more stable hydrosol or colloidal precursor dispersion. Suitable peptizing agents are monoprotic acids or acid compounds such as acetic acid, hydrochloric acid, formic acid, and nitric acid. Multiprotic acids can also be used, but they can rapidly gel the precursor dispersion, making it difficult to handle or to introduce additional components. Some commercial sources of boehmite contain an acid titer (such as absorbed formic or nitric acid) that will assist in forming a stable precursor dispersion.

The precursor dispersion can be formed by any suitable means; for example, in the case of a sol-gel alumina precursor, it can be formed by simply mixing aluminum oxide monohydrate with water containing a peptizing agent or by forming an aluminum oxide monohydrate slurry to which the peptizing agent is added.

Defoamers or other suitable chemicals can be added to reduce the tendency to form bubbles or entrain air while mixing. Additional chemicals such as wetting agents, alcohols, or coupling agents can be added if desired.

A further operation can include providing a mold having at least one mold cavity, or a plurality of cavities formed in at least one major surface of the mold. In some examples, the mold is formed as a production tooling, which can be, for example, a belt, a sheet, a continuous web, a coating roll such as a rotogravure roll, a sleeve mounted on a coating roll, or a die. In one example, the production tooling can include polymeric material. Examples of suitable polymeric materials include thermoplastics such as polyesters, polycarbonates, poly(ether sulfone), poly(methyl methacrylate), polyurethanes, polyvinylchloride, polyolefin, polystyrene, polypropylene, polyethylene or combinations thereof, or thermosetting materials. In one example, the entire production tooling is made from a polymeric or thermoplastic material. In another example, the surfaces of the tooling in contact with the precursor dispersion while the precursor dispersion is drying, such as the surfaces of the plurality of cavities, include polymeric or thermoplastic materials, and other portions of the tooling can be made from other materials. A suitable polymeric coating can be applied to a metal tooling to change its surface tension properties, by way of example.

A polymeric or thermoplastic production tooling can be replicated off a metal master tool. The master tool can have the inverse pattern of that desired for the production tooling. The master tool can be made in the same manner as the production tooling. In one example, the master tool is made of metal (e.g., nickel) and is diamond-turned. In one example, the master tool is at least partially formed using stereolithography. The polymeric sheet material can be heated along with the master tool such that the polymeric material is embossed with the master tool pattern by pressing the two together. A polymeric or thermoplastic material can also be extruded or cast onto the master tool and then pressed. The thermoplastic material is cooled to solidify and produce the production tooling. If a thermoplastic production tooling is utilized, then care should be taken not to generate excessive heat that can distort the thermoplastic production tooling, limiting its life.

Access to cavities can be from an opening in the top surface or bottom surface of the mold. In some examples, the cavities can extend for the entire thickness of the mold. Alternatively, the cavities can extend only for a portion of the thickness of the mold. In one example, the top surface is substantially parallel to the bottom surface of the mold with the cavities having a substantially uniform depth. At least one side of the mold, the side in which the cavities are formed, can remain exposed to the surrounding atmosphere during the step in which the volatile component is removed.

The cavities have a specified three-dimensional shape to make shaped abrasive particles 220. The depth dimension is equal to the perpendicular distance from the top surface to the lowermost point on the bottom surface. The depth of a given cavity can be uniform or can vary along its length and/or width. The cavities of a given mold can be of the same shape or of different shapes.

A further operation involves filling the cavities in the mold with the precursor dispersion (e.g., by a conventional technique). In some examples, a knife roll coater or vacuum slot die coater can be used. A mold release agent can be used to aid in removing the shaped abrasive particles 220 from the mold if desired. Examples of mold release agents include oils such as peanut oil or mineral oil, fish oil, silicones, polytetrafluoroethylene, zinc stearate, and graphite. In general, a mold release agent such as peanut oil, in a liquid, such as water or alcohol, is applied to the surfaces of the production tooling in contact with the precursor dispersion such that from about 0.1 mg/in$^2$ (0.6 mg/cm$^2$) to about 3.0 mg/in$^2$ (20 mg/cm$^2$), or from about 0.1 mg/in$^2$ (0.6 mg/cm$^2$) to about 5.0 mg/in$^2$ (30 mg/cm$^2$), of the mold release agent is present per unit area of the mold when a mold release is desired. In some embodiments, the top surface of the mold is coated with the precursor dispersion. The precursor dispersion can be pumped onto the top surface.

In a further operation, a scraper or leveler bar can be used to force the precursor dispersion fully into the cavity of the mold. The remaining portion of the precursor dispersion that does not enter the cavity can be removed from the top surface of the mold and recycled. In some examples, a small portion of the precursor dispersion can remain on the top surface, and in other examples the top surface is substantially free of the dispersion. The pressure applied by the scraper or leveler bar can be less than 100 psi (0.6 MPa), or less than 50 psi (0.3 MPa), or even less than 10 psi (60 kPa). In some examples, no exposed surface of the precursor dispersion extends substantially beyond the top surface.

In those examples where it is desired to have the exposed surfaces of the cavities result in planar faces of the shaped abrasive particles 220, it can be desirable to overfill the cavities (e.g., using a micronozzle array) and slowly dry the precursor dispersion.

A further operation involves removing the volatile component to dry the dispersion. The volatile component can be removed by fast evaporation rates. In some examples, removal of the volatile component by evaporation occurs at temperatures above the boiling point of the volatile component. An upper limit to the drying temperature often depends on the material the mold is made from. For polypropylene tooling, the temperature should be less than the melting point of the plastic. In one example, for a water dispersion of from about 40 to 50 percent solids and a polypropylene mold, the drying temperatures can be from about 90° C. to about 165° C., or from about 105° C. to about 150° C., or from about 105° C. to about 120° C. Higher temperatures can lead to improved production speeds but can also lead to degradation of the polypropylene tooling, limiting its useful life as a mold.

During drying, the precursor dispersion shrinks, often causing retraction from the cavity walls. For example, if the cavities have planar walls, then the resulting shaped abrasive particles 220 can tend to have at least three concave major sides. It is presently discovered that by making the cavity walls concave (whereby the cavity volume is increased) it is possible to obtain shaped abrasive particles 220 that have at least three substantially planar major sides. The degree of concavity generally depends on the solids content of the precursor dispersion.

A further operation involves removing resultant precursor shaped abrasive particles 220 from the mold cavities. The precursor shaped abrasive particles 220 can be removed from the cavities by using the following processes alone or in combination on the mold: gravity, vibration, ultrasonic vibration, vacuum, or pressurized air to remove the shaped abrasive particles 220 from the mold cavities.

The precursor shaped abrasive particles 220 can be further dried outside of the mold. If the precursor dispersion is dried to the desired level in the mold, this additional drying step is not necessary. However, in some instances it can be economical to employ this additional drying step to minimize the time that the precursor dispersion resides in the mold. The precursor shaped abrasive particles 220 will be dried from 10 to 480 minutes, or from 120 to 400 minutes, at a temperature from 50° C. to 160° C., or 120° C. to 150° C.

A further operation involves calcining the precursor shaped abrasive particles 220. During calcining, essentially all the volatile material is removed, and the various components that were present in the precursor dispersion are transformed into metal oxides. The precursor shaped abrasive particles 220 are generally heated to a temperature from 400° C. to 800° C. and maintained within this temperature range until the free water and over 90 percent by weight of any bound volatile material are removed. In an optional step, it can be desirable to introduce the modifying additive by an impregnation process. A water-soluble salt can be introduced by impregnation into the pores of the calcined, precursor shaped abrasive particles 220. Then the precursor shaped abrasive particles 220 are pre-fired again.

A further operation can involve sintering the calcined, precursor shaped abrasive particles 220. In some examples where the precursor includes rare earth metals, however, sintering may not be necessary. Prior to sintering, the calcined, precursor shaped abrasive particles 220 are not completely densified and thus lack the desired hardness to be used as shaped abrasive particles 220. Sintering takes place by heating the calcined, precursor shaped abrasive particles 220 to a temperature of from 1000° C. to 1650° C. The length of time for which the calcined, precursor shaped abrasive particles 220 can be exposed to the sintering temperature to achieve this level of conversion depends upon various factors, but from five seconds to 48 hours is possible.

In another embodiment, the duration of the sintering step ranges from one minute to 90 minutes. After sintering, the shaped abrasive particles 220 can have a Vickers hardness of 10 GPa (gigaPascals), 16 GPa, 18 GPa, 20 GPa, or greater.

Additional operations can be used to modify the described process, such as, for example, rapidly heating the material from the calcining temperature to the sintering temperature, and centrifuging the precursor dispersion to remove sludge and/or waste. Moreover, the process can be modified by combining two or more of the process steps if desired.

The coated abrasive article 490 produced using the methods and apparatus described herein includes the resin coated backing 450 defining a surface along an x-y direction. In sample embodiments, the resin coated backing 450 has a first layer of binder, described herein as make coat, that is applied over a first surface of the resin coated backing 450. Attached or partially embedded in the make coat are the plurality of shaped abrasive particles 220 formed as described above. Although shaped abrasive particles 220 are shown, any other shaped abrasive particle 220 described herein can be included in coated abrasive article 490. An optional second layer of binder or size coat may be dispersed over shaped abrasive particles 220. The shaped abrasive particles 220 are oriented according to a non-random distribution, although in other embodiments the shaped abrasive particles 220 can be randomly oriented on the resin coated backing 450. In some embodiments, control of a particle's orientation can increase the cut of the abrasive article.

In sample embodiments, the resin coated backing 450 can be flexible or rigid. Examples of suitable materials for forming a flexible backing include a polymeric film, a metal foil, a woven fabric, a knitted fabric, paper, vulcanized fiber, a staple fiber, a continuous fiber, a nonwoven, a foam, a screen, a laminate, and combinations thereof. The resin coated backing 450 can be shaped to allow the coated abrasive article 490 to be in the form of sheets, discs, belts, pads, or rolls. In some embodiments, the resin coated backing 450 can be sufficiently flexible to allow coated abrasive article 490 to be formed into a loop to make an abrasive belt that can be run on suitable grinding equipment.

The make coat secures the shaped abrasive particles 220 to the resin coated backing 450, and the size coat can help to reinforce shaped abrasive particles 220. The make coat and/or size coat can include a resinous adhesive. The resinous adhesive can include one or more resins chosen from a phenolic resin, an epoxy resin, a urea-formaldehyde resin, an acrylate resin, an aminoplast resin, a melamine resin, an acrylated epoxy resin, a urethane resin, a polyester resin, a dying oil, and mixtures thereof.

Although shaped abrasive particles 220 can be randomly distributed, it is also possible to distribute shaped abrasive particles 220 according to a predetermined pattern, as noted above. For example, adjacent shaped abrasive particles 220 of a first layer may be directly aligned with each other in rows or directly aligned in concentric circles. Alternatively, adjacent shaped abrasive particles 220 can be staggered with respect to each other. Additional predetermined patterns of shaped abrasive particles 220 are also within the scope of this disclosure. For example, shaped abrasive particles 220 can be arranged in a pattern that forms a word or image. Shaped abrasive particles 220 can also be arranged in a pattern that forms an image when the coated abrasive article 490 is rotated at a predetermined speed. In addition to, or instead of, shaped abrasive particles 220 being arranged in a predetermined pattern, other particles such as filler particles can also be arranged in a predetermined pattern as described with respect to the shaped abrasive particles 220.

It will be further appreciated that the coated abrasive article 490 can also include conventional (e.g., crushed) abrasive particles. Examples of useful abrasive particles include fused aluminum oxide-based materials such as aluminum oxide, ceramic aluminum oxide (which can include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, sol-gel derived abrasive particles, and mixtures thereof.

The conventional abrasive particles can, for example, have an average diameter ranging from about 10 μm to about 2000 μm, about 20 μm to about 1300 μm, about 50 μm to about 1000 μm, less than, equal to, or greater than about 10 μm, 20, 30, 40, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1650, 1700, 1750, 1800, 1850, 1900, 1950, or 2000 μm. For example, the conventional abrasive particles can have an abrasives industry-specified nominal grade. Such abrasives industry-accepted grading standards include those known as the American National Standards Institute, Inc. (ANSI) standards, Federation of European Producers of Abrasive Products (FEPA) standards, and Japanese Industrial Standard (HS) standards. Exemplary ANSI grade designations (e.g., specified nominal grades) include: ANSI 12 (1842 μm), ANSI 16 (1320 μm), ANSI 20 (905 μm), ANSI 24 (728 μm), ANSI 36 (530 μm), ANSI 40 (420 μm), ANSI 50 (351 μm), ANSI 60 (264 μm), ANSI 80 (195 μm), ANSI 100 (141 μm), ANSI 120 (116 μm), ANSI 150 (93 μm), ANSI 180 (78 μm), ANSI 220 (66 μm), ANSI 240 (53 μm), ANSI 280 (44 μm), ANSI 320 (46 μm), ANSI 360 (30 μm), ANSI 400 (24 μm), and ANSI 600 (16 μm). Exemplary FEPA grade designations include P12 (1746 μm), P16 (1320 μm), P20 (984 μm), P24 (728 μm), P30 (630 μm), P36 (530 μm), P40 (420 μm), P50 (326 μm), P60 (264 μm), P80 (195 μm), P100 (156 μm), P120 (127 μm), P120 (127 μm), P150 (97 μm), P180 (78 μm), P220 (66 μm), P240 (60 μm), P280 (53 μm), P320 (46 μm), P360 (41 μm), P400 (36 μm), P500 (30 μm), P600 (26 μm), and P800 (22 μm). An approximate average particles size of reach grade is listed in parenthesis following each grade designation.

Shaped abrasive particles 220 or crushed abrasive particles can include any suitable material or mixture of materials. For example, shaped abrasive particles 220 can include a material chosen from an alpha-alumina, a fused aluminum oxide, a heat-treated aluminum oxide, a ceramic aluminum oxide, a sintered aluminum oxide, a silicon carbide, a titanium diboride, a boron carbide, a tungsten carbide, a titanium carbide, a diamond, a cubic boron nitride, a garnet, a fused alumina-zirconia, a sol-gel derived abrasive particle, a cerium oxide, a zirconium oxide, a titanium oxide, and combinations thereof. In some embodiments, shaped abrasive particles 220 and crushed abrasive particles can include the same materials. In further embodiments, shaped abrasive particles 220 and crushed abrasive particles can include different materials.

Filler particles can also be included in the coated abrasive articles 490. Examples of useful fillers include metal carbonates (such as calcium carbonate, calcium magnesium carbonate, sodium carbonate, magnesium carbonate), silica (such as quartz, glass beads, glass bubbles and glass fibers), silicates (such as talc, clays, montmorillonite, feldspar, mica, calcium silicate, calcium metasilicate, sodium aluminosilicate, sodium silicate), metal sulfates (such as calcium sulfate, barium sulfate, sodium sulfate, aluminum sodium sulfate, aluminum sulfate), gypsum, vermiculite, sugar, wood flour, a hydrated aluminum compound, carbon black, metal oxides (such as calcium oxide, aluminum oxide, tin oxide, titanium dioxide), metal sulfites (such as calcium sulfite), thermoplastic particles (such as polycarbonate, polyetherimide, polyester, polyethylene, poly(vinylchloride), polysulfone, polystyrene, acrylonitrile-butadiene-styrene block copolymer, polypropylene, acetal polymers, polyurethanes, nylon particles) and thermosetting particles (such as phenolic bubbles, phenolic beads, polyurethane foam particles and the like). The filler may also be a salt such as a halide salt. Examples of halide salts include sodium chloride, potassium cryolite, sodium cryolite, ammonium cryolite, potassium tetrafluoroborate, sodium tetrafluoroborate, silicon fluorides, potassium chloride, magnesium chloride. Examples of metal fillers include, tin, lead, bismuth, cobalt, antimony, cadmium, iron and titanium. Other miscellaneous fillers include sulfur, organic sulfur compounds, graphite, lithium stearate and metallic sulfides. In some embodiments, individual shaped abrasive particles 220 or individual crushed abrasive particles can be at least partially coated with an amorphous, ceramic, or organic coating. Examples of suitable components of the coatings include, a silane, glass, iron oxide, aluminum oxide, or combinations thereof. Coatings such as these can aid in processability and bonding of the particles to a resin of a binder.

In other embodiments, the shaped abrasive particles 220 can include a polymeric material and can be characterized as soft abrasive particles. The soft shaped abrasive particles described herein can independently include any suitable material or combination of materials. For example, the soft shaped abrasive particles can include a reaction product of a polymerizable mixture including one or more polymerizable resins. The one or more polymerizable resins such as a hydrocarbyl polymerizable resin. Examples of such resins include those chosen from a phenolic resin, a urea formaldehyde resin, a urethane resin, a melamine resin, an epoxy resin, a bismaleimide resin, a vinyl ether resin, an aminoplast resin (which may include pendant alpha, beta unsaturated carbonyl groups), an acrylate resin, an acrylated isocyanurate resin, an isocyanurate resin, an acrylated urethane resin, an acrylated epoxy resin, an alkyl resin, a polyester resin, a drying oil, or mixtures thereof. The polymerizable mixture can include additional components such as a plasticizer, an acid catalyst, a cross-linker, a surfactant, a mild-abrasive, a pigment, a catalyst and an antibacterial agent.

Where multiple components are present in the polymerizable mixture, those components can account for any suitable weight percentage of the mixture. For example, the polymerizable resin or resins, may be in a range of from about 35 wt % to about 99.9 wt % of the polymerizable mixture, about 40 wt % to about 95 wt %, or less than, equal to, or greater than about 35 wt %, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or about 99.9 wt %.

If present, the cross-linker may be in a range of from about 2 wt % to about 60 wt % of the polymerizable mixture, from about 5 wt % to about 10 wt %, or less than, equal to, or greater than about 2 wt %, 3, 4, 5, 6, 7, 8, 9, 10, 11, 12, 13, 14, or about 15 wt %. Examples of suitable cross-linkers include a cross-linker available under the trade designation CYMEL 303 LF, of Allnex USA Inc., Alpharetta, Georgia, USA; or a cross-linker available under the trade designation CYMEL 385, of Allnex USA Inc., Alpharetta, Georgia, USA.

If present, the mild-abrasive may be in a range of from about 5 wt % to about 65 wt % of the polymerizable mixture, about 10 wt % to about 20 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, or about 65 wt %. Examples of suitable mild-abrasives include a mild-abrasive available under the trade designation MINSTRON 353 TALC, of Imerys Talc America, Inc., Three Forks, Montana, USA; a mild-abrasive available under the trade designation USG TERRA ALBA NO.1 CALCIUM SULFATE, of USG Corporation, Chicago, Illinois, USA; Recycled Glass (40-70 Grit) available from ESCA Industries, Ltd., Hatfield, Pennsylvania, USA, silica, calcite, nepheline, syenite, calcium carbonate, or mixtures thereof.

If present, the plasticizer may be in a range of from about 5 wt % to about 40 wt % of the polymerizable mixture, about 10 wt % to about 15 wt %, or less than, equal to, or greater than about 5 wt %, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or about 40 wt %. Examples of suitable plasticizers include acrylic resins or styrene butadiene resins. Examples of acrylic resins include an acrylic resin available under the trade designation RHOPLEX GL-618, of DOW Chemical Company, Midland, Michigan, USA; an acrylic resin available under the trade designation HYCAR 2679, of the Lubrizol Corporation, Wickliffe, Ohio, USA; an acrylic resin available under the trade designation HYCAR 26796, of the Lubrizol Corporation, Wickliffe, Ohio, USA; a polyether polyol available under the trade designation ARCOL LG-650, of DOW Chemical Company, Midland, Michigan, USA; or an acrylic resin available under the trade designation HYCAR 26315, of the Lubrizol Corporation, Wickliffe, Ohio, USA. An example of a styrene butadiene resin includes a resin available under the trade designation ROVENE 5900, of Mallard Creek Polymers, Inc., Charlotte, North Carolina, USA.

If present, the acid catalyst may be in a range of from 1 wt % to about 20 wt % of the polymerizable mixture, about 5 wt % to about 10 wt %, or less than, equal to, or greater than about 1 wt %, 2, 3, 4, 5, 6, 7, 8, 9, 10, 11, 12, 13, 14, 15, 16, 17, 18, 19, or about 20 wt %. Examples of suitable acid catalysts include a solution of aluminum chloride or a solution of ammonium chloride.

If present, the surfactant can be in a range of from about 0.001 wt % to about 15 wt % of the polymerizable mixture about 5 wt % to about 10 wt %, less than, equal to, or greater than about 0.001 wt %, 0.01, 0.5, 1, 2, 3, 4, 5, 6, 7, 8, 9, 10, 11, 12, 13, 14, or about 15 wt %. Examples of suitable surfactants include a surfactant available under the trade designation GEMTEX SC-85-P, of Innospec Performance Chemicals, Salisbury, North Carolina, USA; a surfactant available under the trade designation DYNOL 604, of Air Products and Chemicals, Inc., Allentown, Pennsylvania, USA; a surfactant available under the trade designation ACRYSOL RM-8W, of DOW Chemical Company, Midland, Michigan, USA; or a surfactant available under the trade designation XIAMETER AFE 1520, of DOW Chemical Company, Midland, Michigan, USA.

If present, the antimicrobial agent may be in a range of from 0.5 wt % to about 20 wt % of the polymerizable mixture, about 10 wt % to about 15 wt %, or less than, equal to, or greater than about 0.5 wt %, 1, 2, 3, 4, 5, 6, 7, 8, 9, 10, 11, 12, 13, 14, 15, 16, 17, 18, 19, or about 20 wt %. An example of a suitable antimicrobial agent includes zinc pyrithione.

If present, the pigment may be in a range of from about 0.1 wt % to about 10 wt % of the polymerizable mixture, about 3 wt % to about 5 wt %, less than, equal to, or greater than about 0.1 wt %, 0.2, 0.4, 0.6, 0.8, 1, 1.5, 2, 2.5, 3, 3.5, 4, 4.5, 5, 5.5, 6, 6.5, 7, 7.5, 8, 8.5, 9, 9.5, or about 10 wt %. Examples of suitable pigments include a pigment dispersion available under the trade designation SUNSPERSE BLUE 15, of Sun Chemical Corporation, Parsippany, New Jersey, USA; a pigment dispersion available under the trade designation SUNSPERSE VIOLET 23, of Sun Chemical Corporation, Parsippany, New Jersey, USA; a pigment dispersion available under the trade designation SUN BLACK, of Sun Chemical Corporation, Parsippany, New Jersey, USA; or a pigment dispersion available under the trade designation BLUE PIGMENT B2G, of Clariant Ltd., Charlotte, North Carolina, USA. The mixture of components can be polymerized by curing.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

The above-presented description and figures are intended by way of example only and are not intended to limit the illustrative embodiments in any way except as set forth in the appended claims. It is noted that various technical aspects of the various elements of the various exemplary embodiments that have been described above can be combined in numerous other ways, all of which are considered to be within the scope of the disclosure.

Accordingly, although exemplary embodiments have been disclosed for illustrative purposes, those skilled in the art will appreciate that various modifications, additions, and substitutions are possible. Therefore, the disclosure is not limited to the above-described embodiments but may be modified within the scope of appended claims, along with their full scope of equivalents.

What is claimed is:

1. A coated abrasive article maker apparatus comprising:
   a production tooling in the form of an endless belt having a dispensing surface with a plurality of cavities, wherein at least a portion of the plurality of cavities is missing in a pattern transition zone of the production tooling;
   at least one roller that guides the production tooling through the coated abrasive article maker apparatus, the at least one roller including at least one drive roller for pulling the endless belt in a direction of travel;
   an abrasive particle feeder positioned adjacent the production tooling so as to dispense shaped abrasive particles onto the dispensing surface and into the plurality of cavities of the production tooling;
   a resin coated backing guide that guides a resin coated backing through the coated abrasive article maker apparatus in the direction of travel, the resin coated backing positioned to receive shaped abrasive particles from the plurality of cavities of the production tooling at a deposit point;
   means for detecting the pattern transition zone as the production tooling moves in the direction of travel and for providing pattern transition zone detection data; and
   at least one controller that receives the pattern transition zone detection data and controls at least one of a speed of rotation of the drive roller and a speed of the resin coated backing guide in accordance with the pattern transition zone detection data, whereby a speed of at least one of the production tooling and the resin coated backing is adjusted as the detected pattern transition zone passes the deposit point so as to change a pattern density of the shaped abrasive particles in a portion of the resin coated backing corresponding to the pattern transition zone of the production tooling.

2. An apparatus as in claim 1, wherein the pattern transition zone comprises a splice zone where the first end of the production tooling is spliced to the second end of the production tooling to form the endless belt, and the at least one controller receives splice zone detection data and controls at least one of a speed of rotation of the drive roller and a speed of the resin coated backing guide in accordance with the splice zone detection data, whereby at least one of the production tooling is sped up and the resin coated backing is slowed down for a duration of a detected splice zone as the detected splice zone passes the deposit point.

3. An apparatus as in claim 1, wherein the drive roller comprises a vacuum pull roll that applies a vacuum to said production tooling to hold said shaped abrasive particles in said plurality of cavities during rotation of said vacuum pull roll, said vacuum pull roll being disposed adjacent said resin coated backing whereby the deposit point comprises a position on said vacuum pull roll where the vacuum is released to enable the shaped abrasive particles to fall onto said resin coating backing under the force of gravity.

4. An apparatus as in claim 1, wherein the detecting means comprises a vision system that visually recognizes said pattern transition zone on said production tooling.

5. An apparatus as in claim 1, wherein the detecting means comprises a magnet that recognizes metal embedded into said production tooling to mark said pattern transition zone.

6. An apparatus as in claim 1, wherein the detecting means comprises means for measuring a position of the pattern transition zone as the endless belt rotates in the direction of travel.

7. An apparatus as in claim 1, wherein the pattern transition zone detection data comprises times t1 and t2 marking the beginning and end of the pattern transition zone, respectively, and the least one controller controls for a time t2-t1 relative speeds of rotation of the drive roller and the resin coated backing guide at the deposit point.

8. An apparatus as in claim 1, wherein the at least one controller comprises a single controller that controls the speeds of the production tooling and the resin coated backing guide.

9. A coated abrasive article maker apparatus comprising:
a production tooling in the form of an endless belt having a dispensing surface with a plurality of cavities, wherein at least a portion of the plurality of cavities is missing in a splice zone of the production tooling;
at least one roller that guides the production tooling through the coated abrasive article maker apparatus, the at least one roller including at least one drive roller for pulling the endless belt in a direction of travel;
an abrasive particle feeder positioned adjacent the production tooling so as to dispense shaped abrasive particles onto the dispensing surface and into the plurality of cavities of the production tooling;
a resin coated backing guide that guides a resin coated backing through the coated abrasive article maker apparatus in the direction of travel, the resin coated backing positioned to receive shaped abrasive particles from the plurality of cavities of the production tooling at a deposit point;
means for detecting the splice zone as the production tooling moves in the direction of travel and for providing splice zone detection data; and
at least one controller that receives the splice zone detection data and controls at least one of a speed of rotation of the drive roller and a speed of the resin coated backing guide in accordance with the splice zone detection data, whereby at least one of the production tooling is sped up and the resin coated backing is slowed down for a duration of a detected splice zone as the detected splice zone passes the deposit point.

10. An apparatus as in claim 9, wherein the drive roller comprises a vacuum pull roll that applies a vacuum to said production tooling to hold said shaped abrasive particles in said plurality of cavities during rotation of said vacuum pull roll, said vacuum pull roll being disposed adjacent said resin coated backing whereby the deposit point comprises a position on said vacuum pull roll where the vacuum is released to enable the shaped abrasive particles to fall onto said resin coating backing under the force of gravity.

11. An apparatus as in claim 9, wherein the detecting means comprises a vision system that visually recognizes said splice zone on said production tooling.

12. An apparatus as in claim 9, wherein the detecting means comprises a magnet that recognizes metal embedded into said production tooling to mark said splice zone.

13. An apparatus as in claim 9, wherein the detecting means comprises means for measuring a position of the pattern transition zone as the endless belt rotates in the direction of travel.

14. An apparatus as in claim 9, wherein the splice zone detection data comprises times t1 and t2 marking the beginning and end of the splice zone, respectively, and the least one controller controls for a time t2-t1 relative speeds of rotation of the drive roller and the resin coated backing guide at the deposit point.

15. A method of making coated abrasive articles comprising:
providing a production tooling in the form of an endless belt having a dispensing surface with a plurality of cavities, wherein at least a portion of the plurality of cavities is missing in a pattern transition zone of the production tooling;
guiding the production tooling in a direction of travel past an abrasive particle feeder;
dispensing shaped abrasive particles onto the dispensing surface and into the plurality of cavities of the production tooling;
guiding a resin coated backing adjacent the production tooling in the direction of travel;
providing shaped abrasive particles from the plurality of cavities of the production tooling onto the resin coated backing at a deposit point;
detecting a pattern transition zone as the production tooling moves in the direction of travel and providing pattern transition zone detection data; and
controlling at least one of a speed of the production tooling and a speed of the resin coated backing in the direction of travel in response to the pattern transition zone detection data, whereby a speed of at least one of the production tooling and the resin coated backing is adjusted as the detected pattern transition zone passes the deposit point so as to change a pattern density of the shaped abrasive particles in a portion of the resin coated backing corresponding to the pattern transition zone of the production tooling.

16. A method as in claim 15, wherein the pattern transition zone comprises a splice zone where the first end of the production tooling is spliced to the second end of the production tooling to form the endless belt, and wherein controlling at least one of a speed of the production tooling and a speed of the resin coated backing in the direction of travel in response to the pattern transition zone detection data comprises receiving splice zone detection data and controlling at least one of a speed of the production tooling and a speed of the resin coated backing in accordance with the splice zone detection data, whereby at least one of the production tooling is sped up and the resin coated backing is slowed down for a duration of a detected splice zone as the detected splice zone passes the deposit point.

17. A method as in claim 15, wherein a vacuum pull roll is disposed adjacent said resin coated backing, further comprising said vacuum pull roll applying a vacuum to said production tooling to hold said shaped abrasive particles in said plurality of cavities during rotation of said vacuum pull roll and the vacuum pull roll releasing the vacuum to enable the shaped abrasive particles to fall onto said resin coating backing under the force of gravity at the deposit point.

18. A method as in claim 15, wherein detecting the pattern transition zone comprises a vision system visually recognizing said pattern transition zone on said production tooling.

19. A method as in claim 15, wherein detecting the pattern transition zone comprises a magnet recognizing metal embedded into said production tooling to mark said pattern transition zone.

20. A method as in claim 15, wherein detecting the pattern transition zone comprises means for measuring a position of the pattern transition zone as the endless belt rotates in the direction of travel.

21. A method as in claim 15, wherein the pattern transition zone detection data comprises times t1 and t2 marking the beginning and end of the pattern transition zone, respectively, and controlling at least one of the speed of the production tooling and the speed of the resin coated backing in the direction of travel comprises controlling for a time t2-t1 relative speeds of the production tooling and the resin coated backing at the deposit point.

* * * * *